(12) United States Patent
Niranjan et al.

(10) Patent No.: US 8,442,549 B2
(45) Date of Patent: May 14, 2013

(54) AUTOMATIC DISCOVERY AND CONNECTIVITY PROTOCOL FOR BLUETOOTH SCATTERNET FORMATION

(75) Inventors: Niranjan, Richardson, TX (US); Mohan Reddy Duggi, Garland, TX (US); Guoxin Fan, Plano, TX (US); Nim K. Leung, Plano, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 917 days.

(21) Appl. No.: 11/770,519

(22) Filed: Jun. 28, 2007

(65) Prior Publication Data

US 2008/0267147 A1 Oct. 30, 2008

Related U.S. Application Data

(60) Provisional application No. 60/913,630, filed on Apr. 24, 2007.

(51) Int. Cl.
*H04W 24/00* (2009.01)
*H04W 4/00* (2009.01)

(52) U.S. Cl.
USPC ........................................ 455/456.1; 370/328

(58) Field of Classification Search .................. 370/315, 370/338, 328, 311, 324; 455/574, 410, 421
See application file for complete search history.

(56) References Cited

U.S. PATENT DOCUMENTS

| | | | |
|---|---|---|---|
| 7,089,298 B2 * | 8/2006 | Nyman et al. | 709/220 |
| 2004/0246931 A1 * | 12/2004 | Thubert et al. | 370/338 |
| 2006/0176842 A1 * | 8/2006 | Tamura | 370/315 |
| 2007/0037574 A1 * | 2/2007 | Libov et al. | 455/435.2 |
| 2008/0092204 A1 * | 4/2008 | Bryce et al. | 725/143 |
| 2008/0112354 A1 * | 5/2008 | Toutonghi | 370/328 |

OTHER PUBLICATIONS

Duggi, Mohan Reddy, et al.; "Architecture for MANET over Bluetooth"; U.S. Appl. No. 11/760,123, filed Jun. 28, 2007; Specification 23 pgs.; 4 Drawing Sheets (Figs. 1-5).
Niranjan; "Application Design Framework for MANET over Bluetooth"; U.S. Appl. No. 11/831,344, filed Jul. 31, 2007; Specification 20 pgs.; 4 Drawing Sheets (Figs. 1-5).

* cited by examiner

*Primary Examiner* — Michael Faragalla

(57) ABSTRACT

A system and method for wireless communication by a plurality of devices in a scatternet network is provided. The method includes discovering one or more of the plurality of devices in the scatternet network. The method includes determining roles for one or more of the plurality of devices, and transferring data between one or more of the plurality of devices. The discovering of other devices, determining roles, and transferring data between one or more of the plurality of devices occur substantially simultaneously.

20 Claims, 20 Drawing Sheets

Before

After

Before

After

Before

After

Before

After

Before

After

Before

After

Before

After

Before

After

AUTOMATIC DISCOVERY AND CONNECTIVITY PROTOCOL FOR BLUETOOTH SCATTERNET FORMATION

CROSS-REFERENCE TO RELATED APPLICATIONS

The present application claims the benefit under at least 35 U.S.C. §119(e) of U.S. Provisional Application No. 60/913, 630 filed Apr. 24, 2007 and entitled "Automatic Discovery and Connectivity Protocol for Bluetooth Scatternet Formation", inventors Niranjan et al. and which is incorporated herein by reference for all purposes.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Traditional local area networks (LANs) typically have a central server that acts as a controller and coordinator for data traffic among the clients in the network. Communication between clients in a traditional LAN typically does not occur directly from one client to another. Instead, data might be sent from a client to the server and then from the server to another client. The server might also handle the logging in of clients, the synchronization of the activities of the clients, and other centralized control functions.

SUMMARY

In one embodiment, a method for wireless communication by a plurality of devices in a scatternet network is provided. The method includes discovering one or more of the plurality of devices in the scatternet network. The method includes determining roles for one or more of the plurality of devices, and transferring data between one or more of the plurality of devices. The discovering of other devices, determining roles, and transferring data between one or more of the plurality of devices occur substantially simultaneously.

In another embodiment, a system for communication in a scatternet is provided. The system includes a wireless device having a processor programmed to discover at least one other wireless device in the scatternet network. The processor programmed to determine roles as between the wireless device and the other wireless device and transfer data between the wireless device and the other wireless device. The discovery of the other wireless device, determining the roles, and transferring data between the wireless device and the other wireless device occurs at substantially the same time.

In still other embodiments, a system for communication in a scatternet network is provided. The system includes a first wireless device and a second wireless device. The first wireless device communicates to discover the second wireless device. The first and second wireless devices determine roles. The first and second wireless devices transfer data between one another, such that the discovery, roles determination, and data transfer between the first and second devices occurring at substantially the same time.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

It should be understood at the outset that although illustrative implementations of one or more embodiments are illustrated below, the disclosed systems and/or methods may be implemented using any number of techniques, whether currently known or in existence. The disclosure should in no way be limited to the illustrative implementations, drawings, and techniques illustrated below, but may be modified within the scope of the appended claims along with their full scope of equivalents.

A mobile ad hoc network (MANET) can be defined as a group of wireless computing devices capable of communicating directly with one another without a server acting as a central coordinator or scheduler for the data traffic between the devices. A MANET typically comprises a plurality of wireless devices such as laptop computers, handheld computers, mobile phones or mobile handsets, personal digital assistants, wireless access points, and similar devices. The devices might be capable of communicating with one another via a well-known wireless data transfer protocol, such as Transmission Control Protocol/Internet Protocol (TCP/IP).

A MANET in which the wireless devices communicate with one another via the Bluetooth protocol is known as a piconet and a group of connected piconets is known as a scatternet. Since there is no central controller in a scatternet, the devices in a scatternet might periodically communicate with one another in order to establish the paths over which data will travel between the devices. A procedure might be followed in which the devices send each other information to discover which devices are present in the scatternet and to determine what roles the devices will play in the scatternet. When these tasks are complete, data transfer among the devices can occur. This procedure can be considered a three-phase protocol since the discovery of other devices, the determination of roles, and the transfer of data occur in independent, sequential phases.

In an embodiment, a single-phase protocol is used to establish how data will be transferred between the devices in a scatternet and to perform the actual data transfer. That is, discovery, role determination, and data transfer can occur substantially simultaneously.

Figure 1:
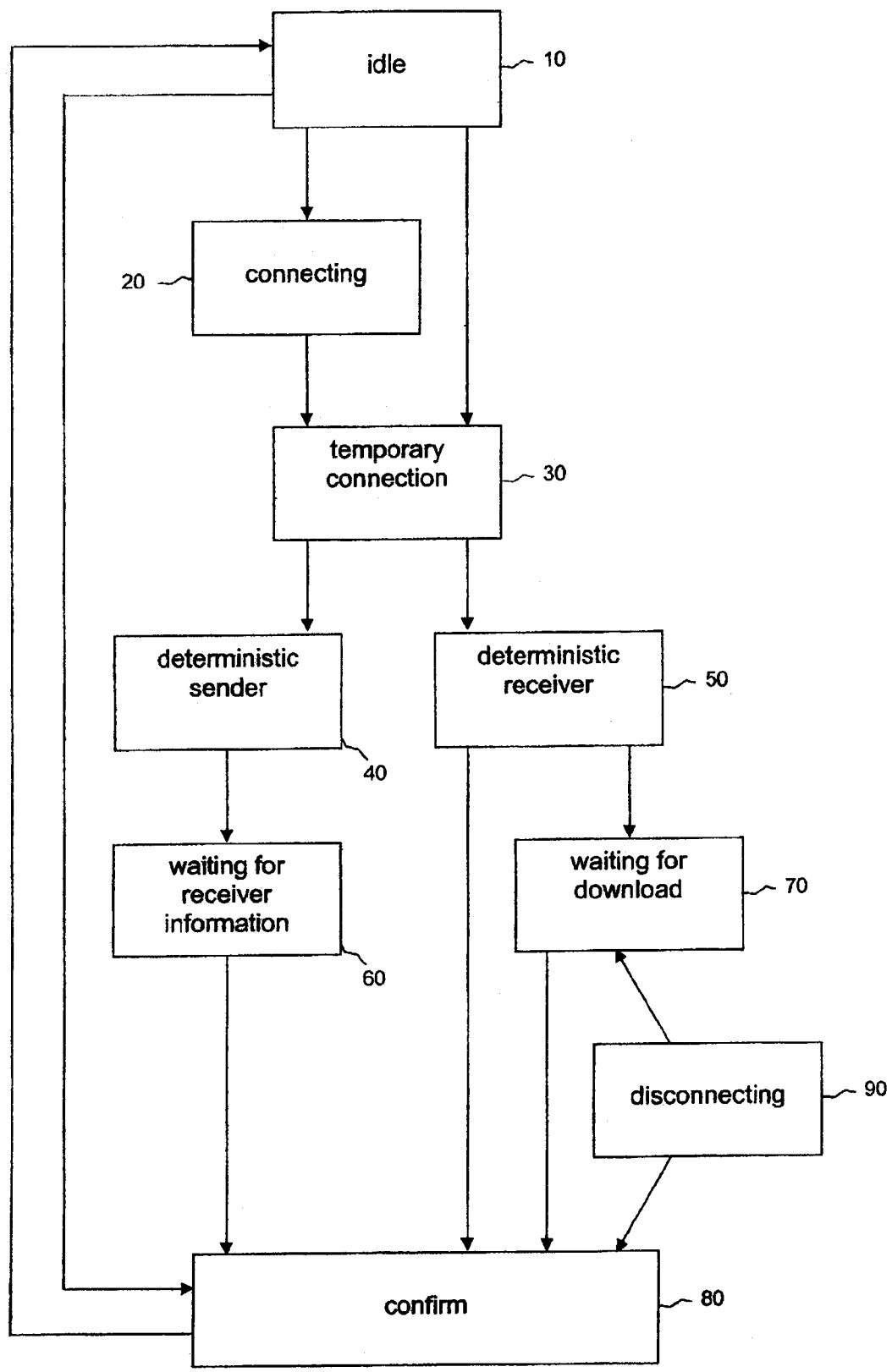
FIG. 1 is a state diagram according to an embodiment of the disclosure.

FIG. 1 illustrates an embodiment of a state diagram of the states that wireless devices in a scatternet might enter in the single-phase protocol. A plurality of devices might begin in an idle state 10. All of the devices might already have active connections within the scatternet and might be attempting to establish more efficient connections. Alternatively, one or more of the devices might not yet have active connections within the scatternet and might be attempting to join the scatternet through a connection with a connected device.

While in the idle state 10, each device might periodically perform inquiries to determine the presence and status of other devices in the scatternet or attempting to join the scatternet. For example, a device might scan for new devices for five seconds out of every twenty second interval. As a result of the scan, one of the devices, which can be referred to as device X, might discover the presence of another device, which can be referred to as device Y. Device X might then send a request to device Y to connect to device Y. Device X would then move into a connecting state 20. Device Y might then send a confirmation to device X confirming the connection between X and Y. Device X would then move from the connecting state 20 into a temporary connection state 30 and device Y would move directly from the idle state 10 into the temporary connection state 30.

At this point, a temporary connection could be said to exist between X and Y. One of skill in the art will recognize that the Bluetooth connection that exists between X and Y at this point could be considered part of the topology of the scatternet. However, the connection can be referred to as temporary because X and Y may not necessarily remain connected via this connection. Further interactions between X and Y might indicate that it is preferable that the temporary connection should be broken.

While in the temporary connection state 30, X and Y exchange hop information specifying how many hops away X and Y are from other devices in the scatternet. Using this information, X and Y decide which one will make the decision whether to maintain the temporary connection or break the temporary connection. The device that is chosen to make the decision can be referred to as the deterministic sender and moves into a deterministic sender state 40. The other device can be referred to as the deterministic receiver and moves into a deterministic receiver state 50.

The deterministic sender makes four decisions at this point. One decision is whether to break the temporary connection that has been established between X and Y. Another decision is whether to do a role switch on the temporary connection. It is well known in the art that, when a connection is established between two devices in a scatternet, one device might take on the role of the master and the other device might take on the role of the slave. In the deterministic sender state 40, the deterministic sender might decide whether a reversal of these roles should take place between X and Y. Another decision is whether to break an active connection that might have been established between X and another device in the scatternet or between Y and another device in the scatternet. Another decision is whether to do a role switch on one or both of these active connections. An embodiment of a role determination procedure will be described in detail below.

After making these decisions, the deterministic sender informs the deterministic receiver of the decisions. If the decision was made to maintain the temporary connection, the deterministic sender then moves into a waiting for receiver information state 60. Upon receiving the decision information, the deterministic receiver updates its local information to indicate whether the temporary connection or any of the deterministic receiver's active connections will be broken and whether a role switch will occur on the temporary connection or any of the deterministic receiver's active connections.

The deterministic receiver then transmits receiver information to the deterministic sender. The receiver information might inform the deterministic sender of any local updates made by the deterministic receiver. Upon transmitting the receiver information, the deterministic receiver might move into a waiting for download state 70 if the deterministic receiver has the role of slave. If the deterministic receiver has the role of master, the deterministic receiver might move into a confirm state 80. Upon receiving the receiver information, the deterministic sender moves into the confirm state 80.

With both device X (in this case, the deterministic sender) and device Y (in this case, the deterministic receiver) in the confirm state 80, device X and device Y each send update information to the other devices in the scatternet that are one hop away. The update information provides the other devices with the appropriate connectivity, routing, and role information for devices X and Y and any other information necessary to allow active connections to be established or continued between devices X and Y and the other devices in the scatternet. After the update information has been sent, device X and device Y both return to the idle state 10. If a device receives an update message from a neighboring device, the device might move directly from the idle state 10 to the confirm state 80.

In the case where the deterministic sender decides not to maintain the temporary connection, the deterministic sender sends a disconnect request message to the deterministic receiver. The deterministic sender then moves into a disconnecting state 90. Upon receiving the disconnect request message, the deterministic receiver moves directly to the confirm state 80 and sends a confirmation of the disconnect request message to the deterministic sender. Upon receiving the confirmation, the deterministic sender moves from the disconnecting state 90 to the confirm state 80. Both devices might update the other devices in the scatternet that the temporary connection has been broken and then return to the idle state 10.

If a connection failure occurs for any other reason, for example a battery failure or a movement of one of the devices outside the range of the other, device X and device Y will both move directly from their current states into the disconnecting state 90. Upon confirmation of the disconnection, both devices might update the other devices in the scatternet of the disconnection. Device X and device Y might then move to the confirm state 80 and then return to the idle state 10. After a device has disconnected, if its new role is a slave, it might wait for a download message from its master and might move from the disconnecting state 90 to the waiting for download state 70.

Figure 2:
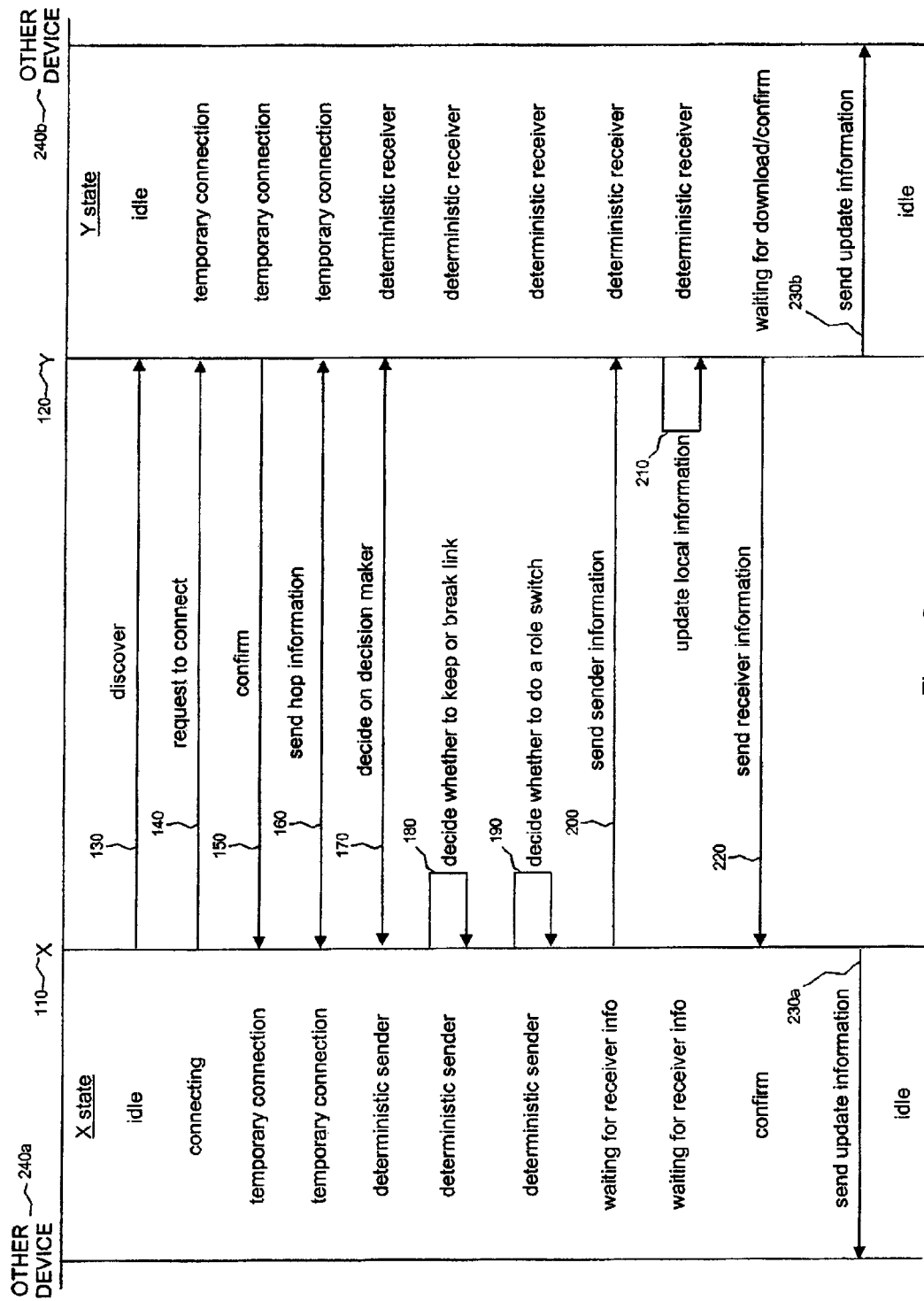
FIG. 2 is a call flow diagram according to an embodiment of the disclosure.

FIG. 2 is a call flow diagram depicting an embodiment of a sequence of events that might occur in the connection of a Bluetooth-based wireless device X 110 and a Bluetooth-based wireless device Y 120 to each other and/or to a scatternet. Adjacent to each event is an indication of the state of device X 110 and device Y 120 at the time of the event. At event 130, device X 110 and device Y 120 are in the idle state when device X 110 discovers device Y 120. At event 140, device X 110 sends a request to connect to device Y 120. This places device X 110 in the connecting state and places device Y 120 in the temporary connection state. At event 150, device Y 120 sends a confirmation of the request to connect to device X 110. This places device X 110 in the temporary connection state while device Y 120 remains in the temporary connection state. A decision about which device will act as the master and which device will act as the slave may be made at this time.

Device X 110 and device Y 120 remain in the temporary connection state while they send hop information to one another at event 160. The hop information might specify how many hops away each device is from the other devices to which it already has active connections. At event 170, device X 110 and device Y 120 decide which one will act as the decision maker for future actions between them. The decision might be based on the hop information that was just exchanged. In this example, it is decided that device X 110 will be the decision maker, so device X 110 moves to the deterministic sender state and device Y 120 moves to the deterministic receiver state.

Device X 110 then decides, at event 180, whether to keep or break the temporary connection that has been created between device X 110 and device Y 120. At event 180, device X 110 also decides whether to keep or break any active connections that had previously been created between device X 110 and other devices or between device Y 120 and other devices. At event 190, device X 110 decides whether a role switch should be performed between device X 110 and device Y 120. Also at event 190, device X 110 decides whether a role switch should be performed between device X 110 and other devices or between device Y 120 and other devices. Events 180 and 190 do not necessarily need to occur in the order indicated. That is, the role switch decisions could take place before or substantially simultaneously with the connection maintenance decisions. Device X 110 and device Y 120 remain in the deterministic sender and deterministic receiver states, respectively, during events 180 and 190.

After making the above decisions, if device X has decided to maintain the connection between device X 110 and device Y 120, device X 110 sends sender information related to its decisions to device Y 120 in event 200. This causes device X 110 to move to the waiting for receiver information state. Device Y 120 remains in the deterministic receiver state. At event 210, device Y 120 updates its local information with the sender information received from device X 110. Device X 110 and device Y 120 remain in the waiting for receiver information and deterministic receiver states, respectively, during event 210. At event 220, after updating its local information, device Y 120 sends receiver information related to any local updates it has made to device X 110. This causes device X 110 to move to the confirm state. If device Y 120 is acting as the slave, this also causes device Y 120 to move to the waiting for download state. If device Y 120 is acting as the master, sending the receiver information causes device Y 120 to move to the confirm state.

At event 230, device X 110 and device Y 120 each send update information to one or more other devices 240 to which device X 110 and device Y 120 already have active connections. The update information can inform the other devices 240 of the connection information that has been established for device X 110 and device Y 120. Device X 110 and device Y 120 then return to the idle state.

Figure 3:
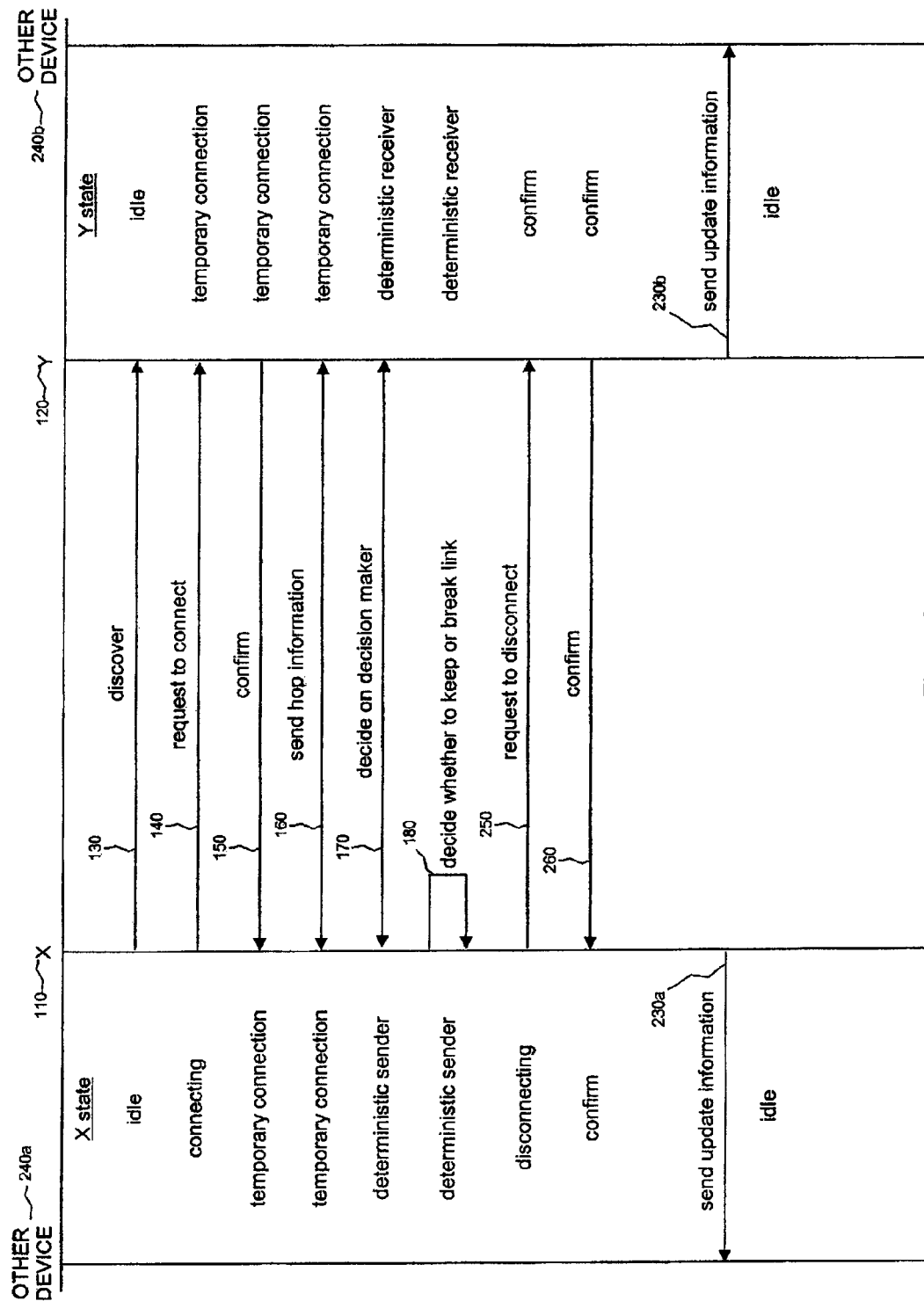
FIG. 3 is an alternative call flow diagram according to an embodiment of the disclosure.

FIG. 3 is a call flow diagram depicting an embodiment of another sequence of events that might occur in the connection of wireless device X 110 and wireless device Y 120. The events that occur up to event 180, and the states of device X 110 and device Y 120 up to event 180, are substantially similar to those described in regard to FIG. 2. However, in this case, at event 180, device X 110, as the deterministic sender, decides not to maintain the temporary connection that was established between device X 110 and device Y 120. Having made this decision, device X 110, at event 250, sends a message to device Y 120 requesting a disconnection of the temporary connection. This causes device X 110 to move to the disconnecting state and causes device Y 120 to move to the confirm state.

At event 260, device Y 120 sends a confirmation of the request to disconnect to device X 110. This causes the disconnection of the temporary connection and places device X 110 in the confirm state. At event 230, device X 110 and device Y 120 might inform one or more other devices 240 that the temporary connection has been broken. Device X 110 and device Y 120 might then move to the idle state.

While the deterministic sender is making the decisions indicated at events 180 and 190, the deterministic sender and/or the deterministic receiver might be receiving topology-related messages from devices with which they have already established active connections. That is, while the deterministic sender is deciding whether to maintain connections and whether to perform role reversals, requests to break connections or to perform role reversals might be coming in to the deterministic sender and/or the deterministic receiver from other devices.

In an embodiment, the deterministic sender and the deterministic receiver delay the processing of these requests during the decision-making process indicated at events 180 and 190. When the deterministic sender completes this decision-making process, it then processes any topology-related requests it received during the decision-making process. The deterministic sender then sends the deterministic receiver its sender information as indicated at event 200. After receiving and processing the sender information, the deterministic receiver processes any topology-related requests it received during the deterministic sender's decision-making process.

The transfer of application-related data between the deterministic sender, the deterministic receiver, and the other devices in the scatternet is not delayed during the deterministic sender's decision-making process. That is, it is only the topology-related information, not the user-generated information, that is delayed. This can be contrasted with the previous three-phase protocols wherein data transfer is typically placed on hold while discovery and role determination take place. With the present single-phase protocol, on the other hand, discovery, role determination, and data transfer can occur substantially simultaneously. Thus while this process might typically be expected to occur one step after another, e.g. the discovery, then the roles determination, then the data transfer, the present disclosure provides for the roles determination, discovery, and data transfer to occur in a non-linear, or non-step by step approach. In this manner, the data transfer, discovery and roles determination may all be going on at about the same time.

It was mentioned above that a role determination procedure can be used to determine the roles that devices in a scatternet will take on. Details of an embodiment of a role determination procedure will now be provided.

Devices in a piconet and devices that are attempting to join a piconet can be referred to as nodes. It is well known in the art that nodes might periodically create temporary connections with other nodes. A node typically cannot have more than one temporary connection at any one time. Two nodes with temporary connections to one another can be referred to as peers. A node that is attempting to join a piconet can be referred to as a free node. It is also well known that when two nodes form a temporary connection, one of the nodes is automatically assigned a role as a temporary master and the other node is automatically assigned a role as a temporary slave.

In some cases, a temporary connection can become a permanent connection or can replace a permanent connection. For example, if a free node is allowed to join a piconet, the temporary connection between the free node and its peer becomes a permanent connection. Alternatively, if a temporary connection between two nodes already in a piconet is found to be more efficient than the previously existing connection between the nodes, the temporary connection might replace the existing connection and become a permanent connection. In another alternative, a temporary connection might be eliminated and the permanent connection between two nodes might be retained.

When a temporary connection becomes permanent, replaces a permanent connection, or is eliminated, the temporary roles of the nodes that were formerly peers in the temporary connection do not necessarily remain in effect. A temporary master might become a permanent slave, a permanent master/slave, or some other role. A temporary slave might become a permanent master, a permanent master/slave, or some other role.

As used herein, the terms "permanent connection" and the like refer to a previously existing connection in a piconet or to a temporary connection that replaces a previously existing connection. Similarly, the terms "permanent role" and the like refer to the role of a node in a permanent connection. However, it should be understood that permanent connections and permanent roles will not necessarily remain unchanged throughout the lifetime of a piconet but may be modified or eliminated at some point.

In an embodiment, a role determination procedure specifies the permanent roles that nodes that were formerly peers in a temporary connection will assume in a permanent connection. Each of the nodes might take on the role of master, slave, master/slave, or some other well known role in a permanent connection with each other and/or with other nodes. The roles of other nodes connected to the former peers might also change as a result of the application of the role determination procedure. The role determination procedure also specifies whether a temporary connection should become a permanent connection, should replace a permanent connection, or should be eliminated.

FIGS. 4-18 illustrate piconets in which an embodiment of the role determination procedure is applied. In each figure, a "before" diagram illustrates one or more piconets that have a temporary connection between two peer nodes. The peers have been automatically assigned temporary roles. An "after" diagram illustrates one or more piconets formed by the application of the role determination procedure to the piconet or piconets in the "before" diagram. The role determination procedure determines how the temporary connection will be handled and what the permanent roles of the peers will be. In each figure, permanent connections are depicted by solid lines and temporary connections are depicted by dashed lines.

Figure 8:
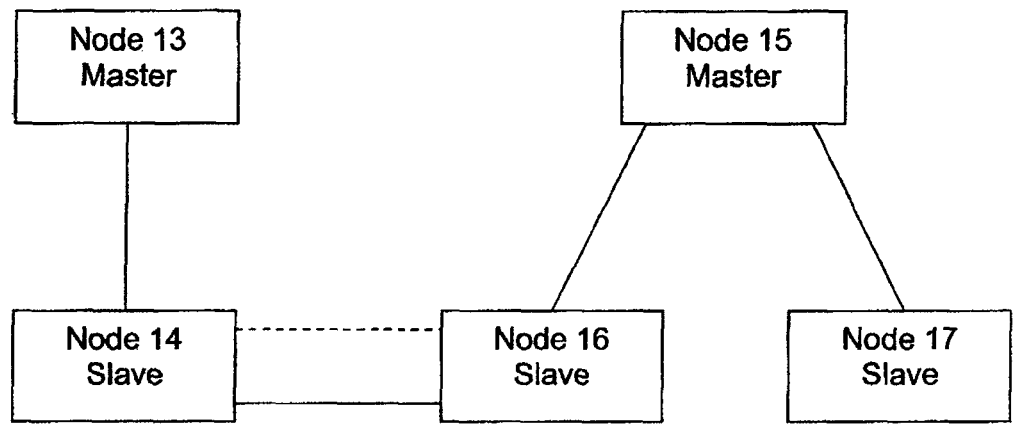
FIG. 8 is a diagram of another plurality of nodes to which a role determination procedure could be applied according to an embodiment of the disclosure.
Figure 8:
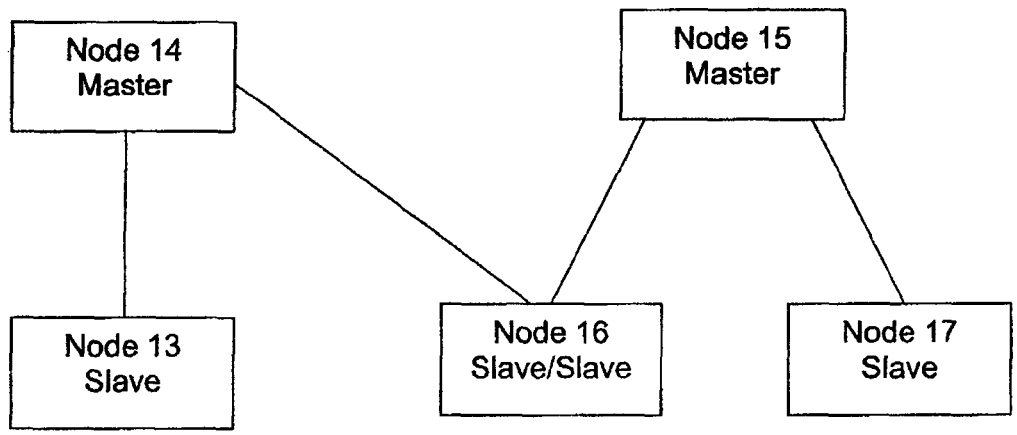
Figure 9:
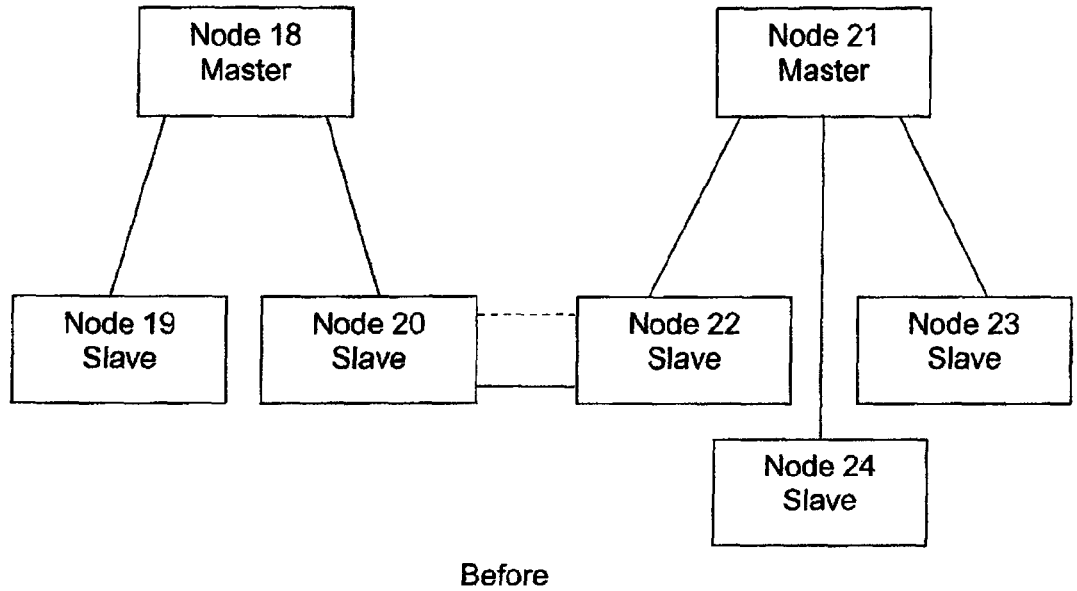
FIG. 9 is a diagram of another plurality of nodes to which a role determination procedure could be applied according to an embodiment of the disclosure.
Figure 9:
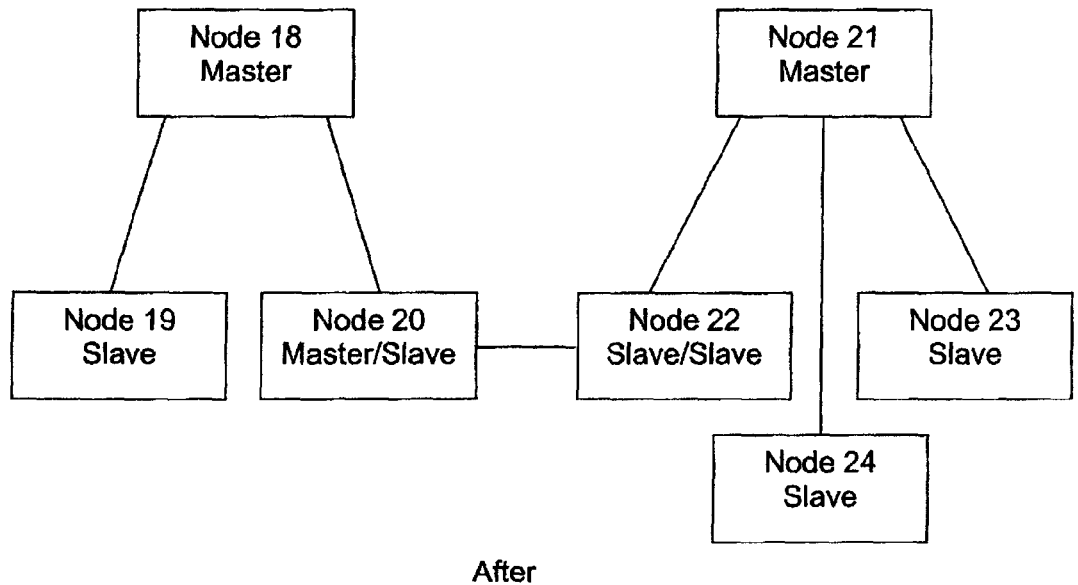
Figure 10:
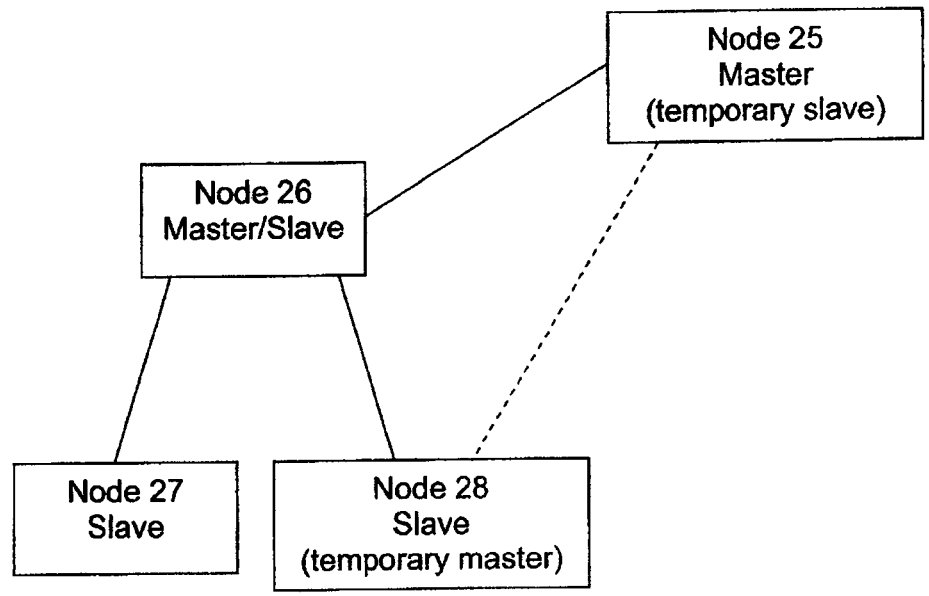
FIG. 10 is a diagram of another plurality of nodes to which a role determination procedure could be applied according to an embodiment of the disclosure.
Figure 10:
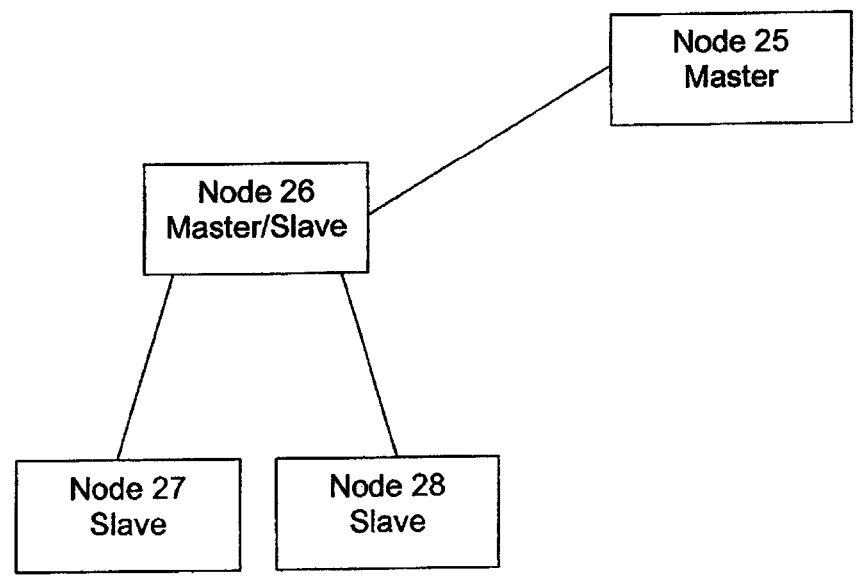
Figure 11:
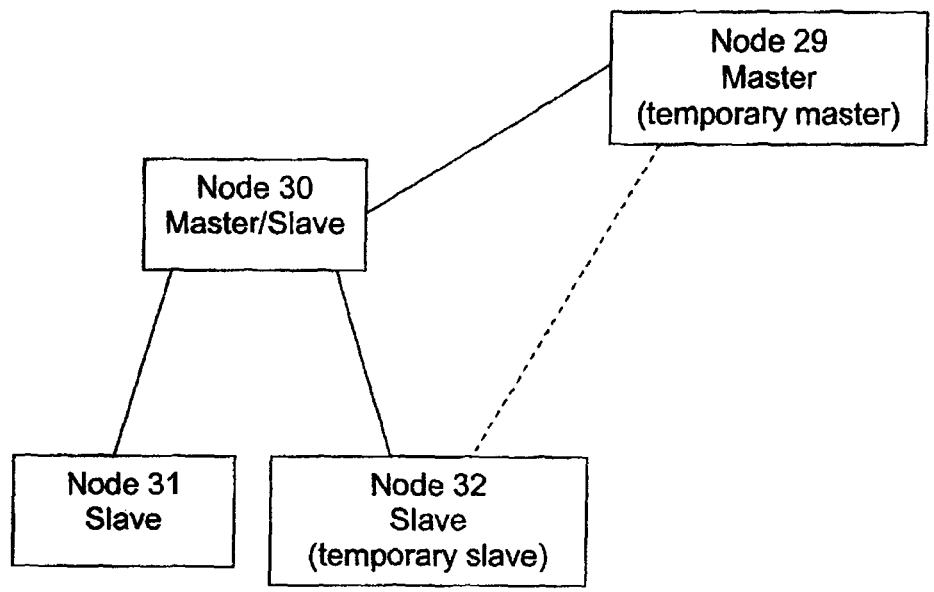
FIG. 11 is a diagram of another plurality of nodes to which a role determination procedure could be applied according to an embodiment of the disclosure.
Figure 11:
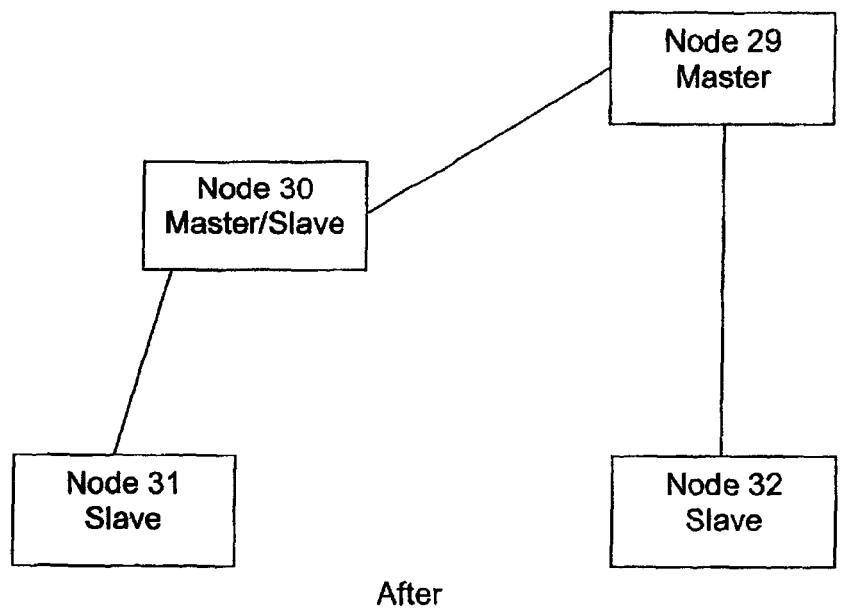
Figure 16:
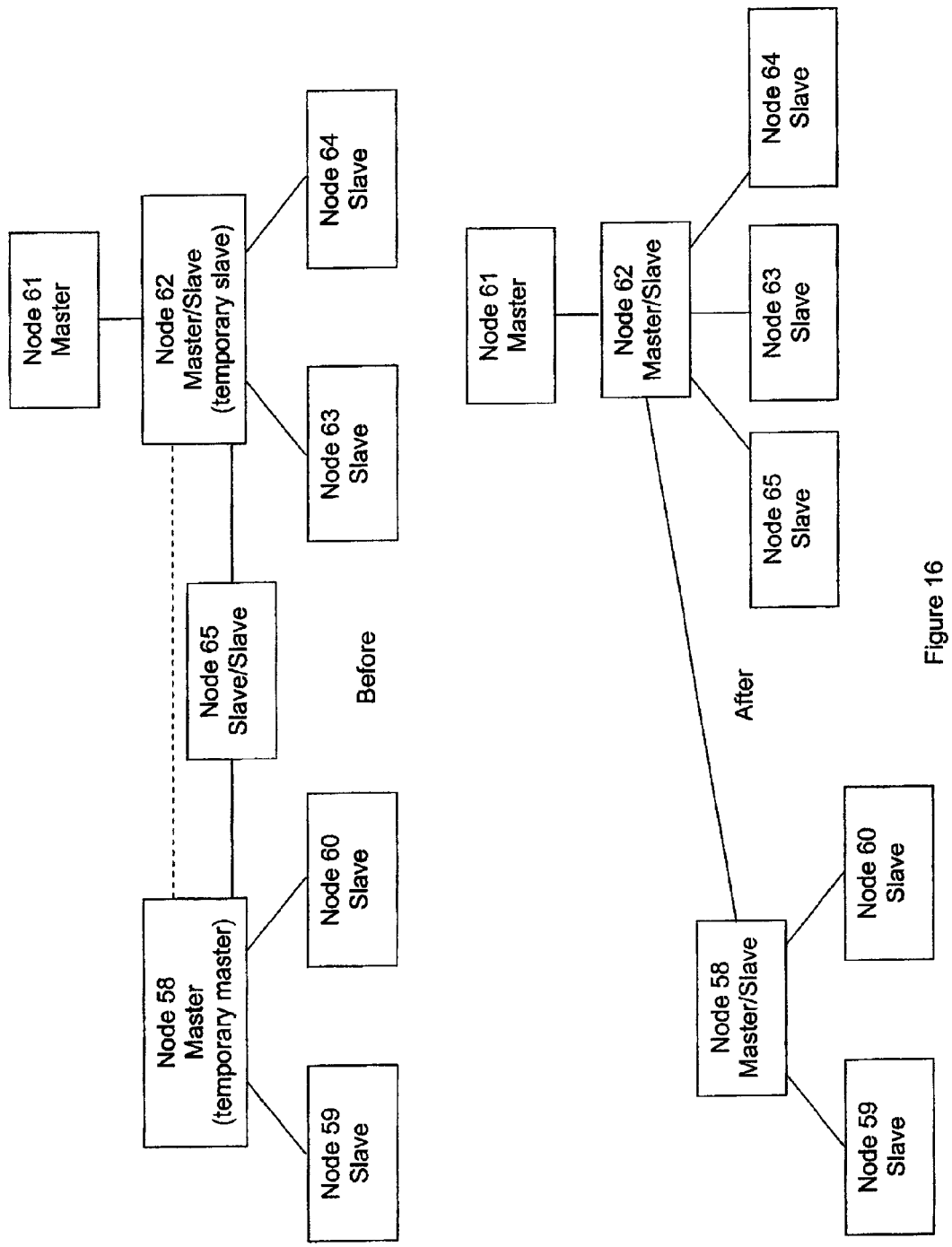
FIG. 16 is a diagram of another plurality of nodes to which a role determination procedure could be applied according to an embodiment of the disclosure.
Figure 17:
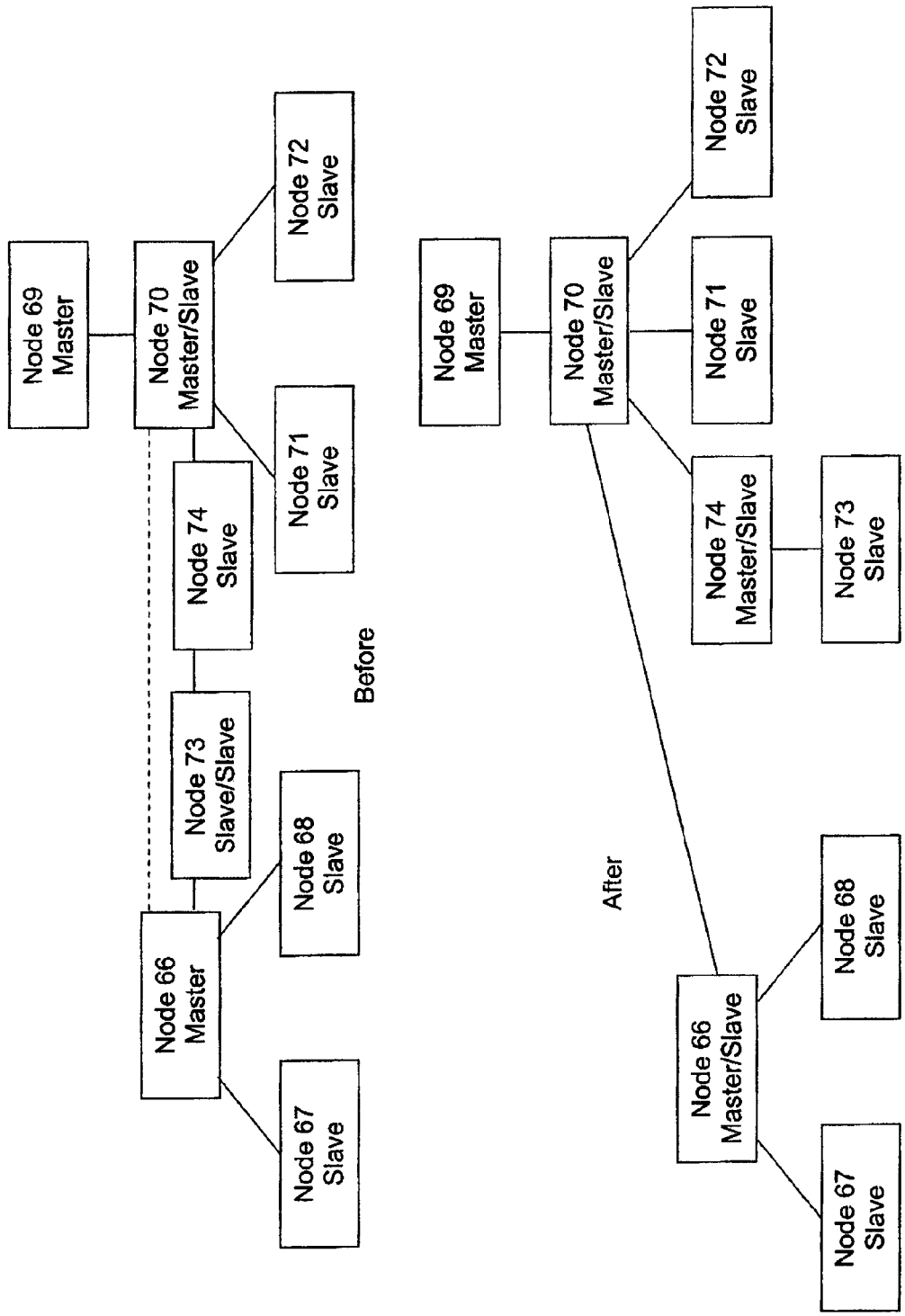
FIG. 17 is a diagram of another plurality of nodes to which a role determination procedure could be applied according to an embodiment of the disclosure.
Figure 18:
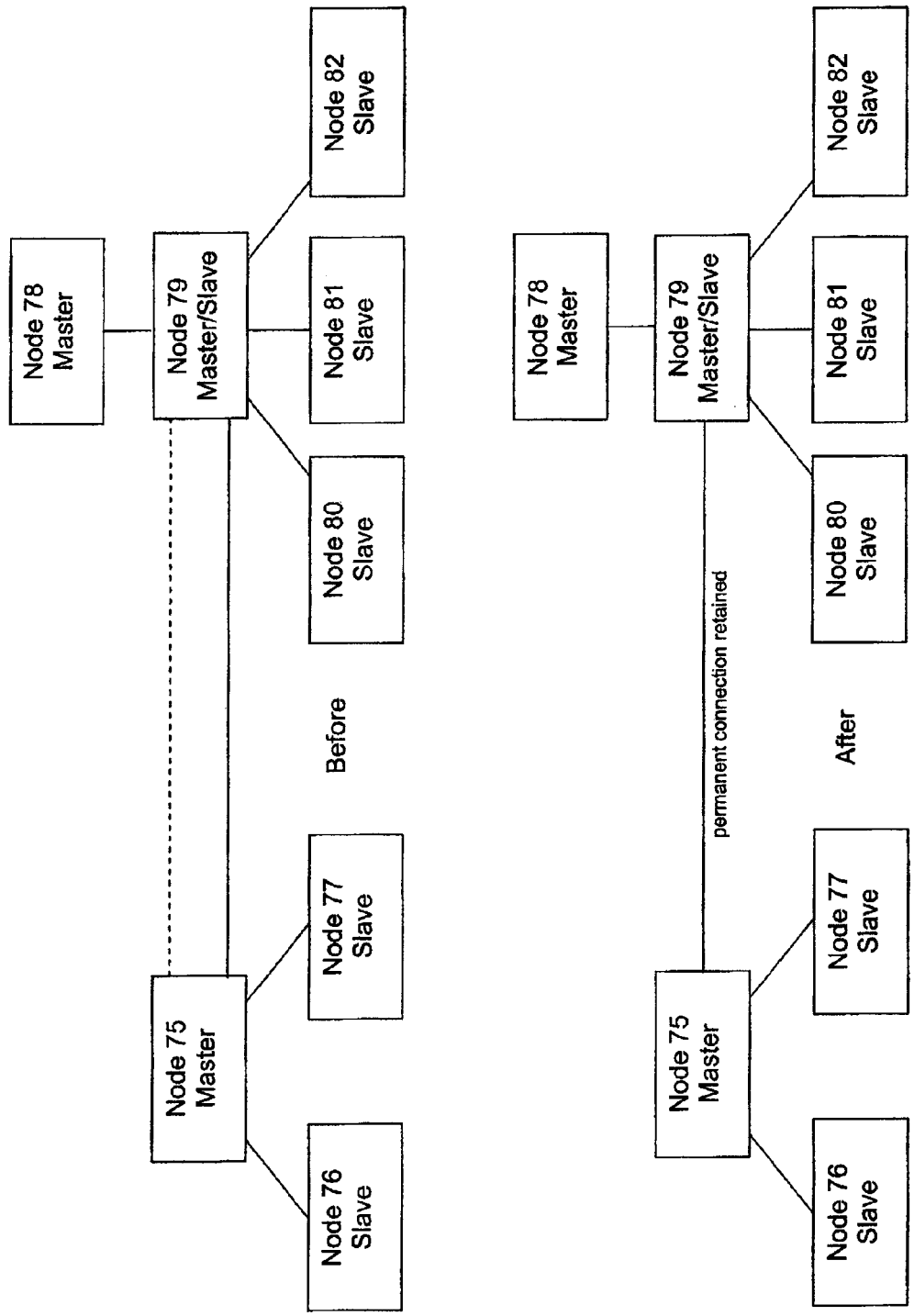
FIG. 18 is a diagram of another plurality of nodes to which a role determination procedure could be applied according to an embodiment of the disclosure.

FIGS. 4-7 depict various scenarios involving a free node joining a piconet. FIGS. 8 and 9 depict two piconets with a temporary connection between a slave node in one piconet and a slave node in the other piconet. FIGS. 10 and 11 depict two piconets with a temporary connection between a slave node in one piconet and a master node or a master/slave node in the other piconet. FIGS. 12-15 depict two piconets with a temporary connection between a master node in one piconet and a master node in the other piconet. FIGS. 16-18 depict two piconets with a temporary connection between a master node in one piconet and a master/slave node in the other piconet.

Figure 4:
FIG. 4 is a diagram of a plurality of nodes to which a role determination procedure could be applied according to an embodiment of the disclosure.
Figure 4:
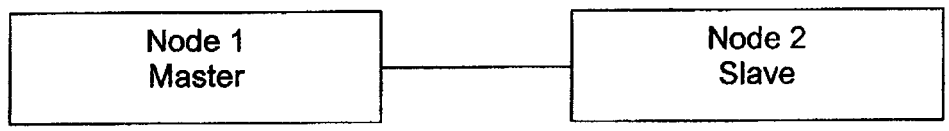

In FIG. 4, two free nodes have made a temporary connection with one another in the "before" piconet. Node 1 has the role of temporary master and Node 2 has the role of temporary slave. In such a case, the role determination procedure assigns the role of permanent master to the node that had the role of temporary master, assigns the role of permanent slave to the node that had the role of temporary slave, and makes the temporary connection permanent. Thus, in the "after" piconet of FIG. 4, Node 1 is the permanent master, Node 2 is the permanent slave, and the temporary connection between the nodes has become permanent.

Figure 5:
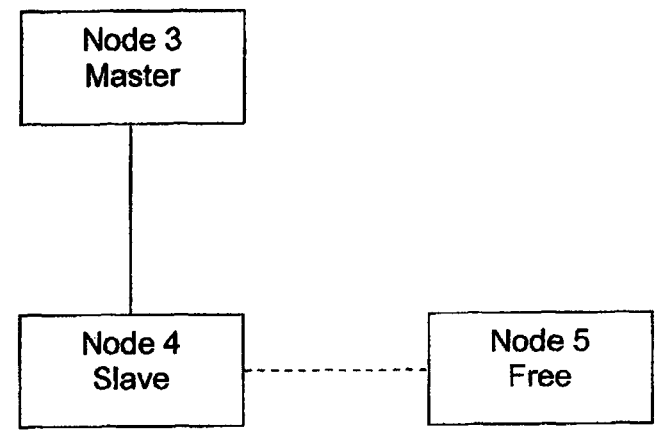
FIG. 5 is a diagram of another plurality of nodes to which a role determination procedure could be applied according to an embodiment of the disclosure.
Figure 5:
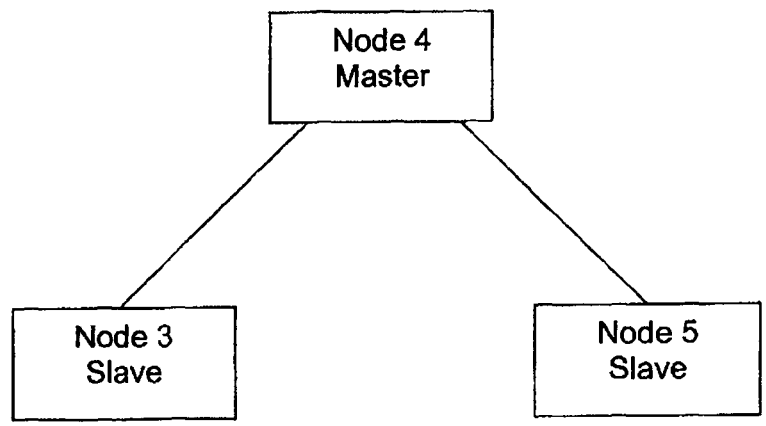

In FIG. 5, in the "before" piconet, Node 3 is a permanent master and Node 4 is the only permanent slave of Node 3. Node 5 is a free node that has established a temporary connection with Node 4. When the role determination procedure is applied to such a piconet, the node that was previously the slave becomes a master, the node that was previously the master becomes a slave to the new master, and the node that was previously free also becomes a slave to the new master. The temporary connection becomes permanent. Thus, in the "after" piconet of FIG. 5, node 4 is now the master, Nodes 3 and 5 are now slaves to Node 4, and the connection between Nodes 4 and 5 has become permanent.

Figure 6:
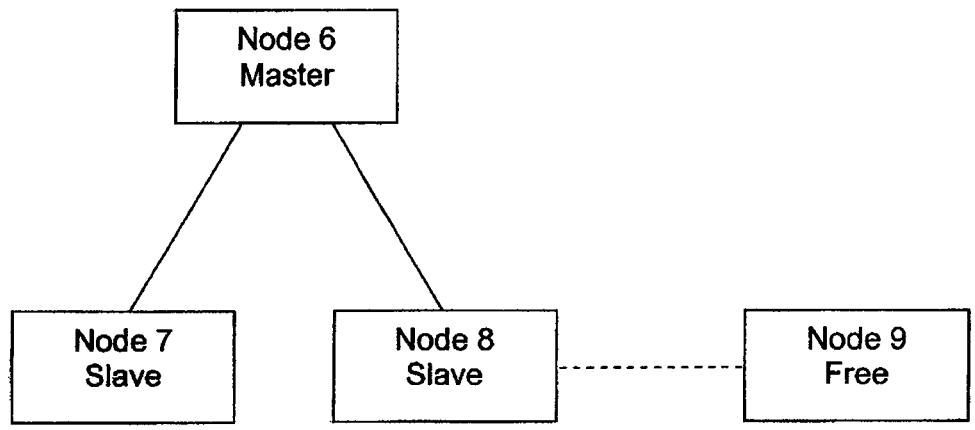
FIG. 6 is a diagram of another plurality of nodes to which a role determination procedure could be applied according to an embodiment of the disclosure.
Figure 6:
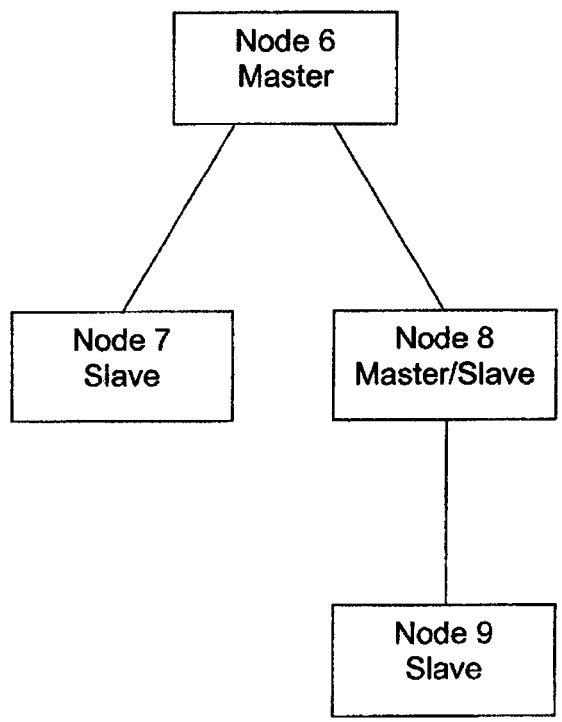

In FIG. 6, in the "before" piconet, Node 6 is a permanent master and Nodes 7 and 8 are permanent slaves of Node 6. Node 9 is a free node that has established a temporary connection with Node 8. In this case, a plurality of slaves are present under the master, as opposed to the situation in FIG. 5, where the master had only one slave. When the role determination procedure is applied to such a piconet, the peer node of the free node becomes a master/slave node and the node that was previously free becomes a slave to the new master/slave. The temporary connection becomes permanent. Thus, in the "after" piconet of FIG. 6, node 8 is now a master/slave that is a slave to Node 6 and a master to Node 9. Node 9 is a slave to Node 8 and the connection between Nodes 8 and 9 has become permanent.

Figure 7:
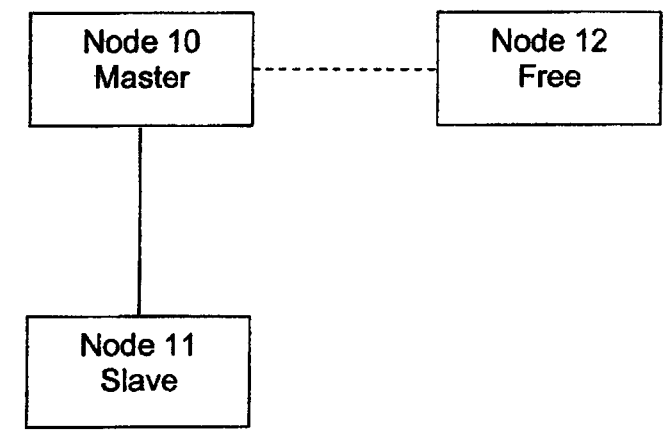
FIG. 7 is a diagram of another plurality of nodes to which a role determination procedure could be applied according to an embodiment of the disclosure.
Figure 7:
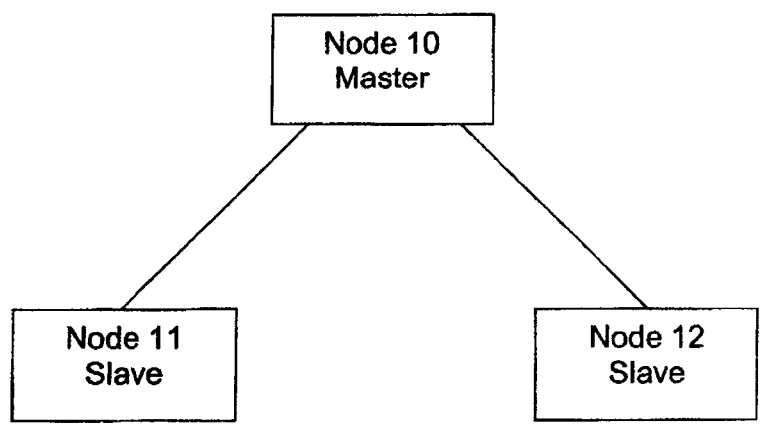

In FIG. 7, in the "before" piconet, Node 10 is a permanent master and Node 11 is a permanent slave of Node 10. Node 12 is a free node that has established a temporary connection with Node 10. When the role determination procedure is applied to such a piconet, the free node becomes a slave of the master and the temporary connection becomes permanent. Thus, in the "after" piconet of FIG. 7, node 10 is now the master of both Node 11 and Node 12. The connection between Nodes 10 and 12 has become permanent. If Node 10 were a master/slave instead of a master, the role determination procedure would be applied in the same manner.

The "before" diagram of FIG. 8 depicts a first piconet that includes Node 13 and Node 14, where Node 13 is the master of Node 14. The "before" diagram also depicts a second piconet that includes Node 15, Node 16, and Node 17, where Node 15 is the master of Nodes 16 and 17. A permanent connection exists between Node 14 in the first piconet and Node 16 in the second piconet. A temporary connection has also been established between these two nodes.

When one of a pair of piconets has only one slave under its master, as is the case with the first piconet, the role determination procedure specifies that the master in that piconet is to remain the master and the slave is to remain the slave. The slave node in the larger piconet that was a peer of the slave node in the smaller piconet becomes a slave/slave. That is, the slave in the larger piconet that previously had the permanent and temporary connections with the slave in the smaller piconet remains the slave of its master in the larger piconet and also becomes the slave of the master in the smaller piconet. A permanent connection is established between the master in the smaller piconet and the slave/slave in the larger piconet.

Applying these rules to the "before" piconet of FIG. 8 results in the "after" piconet of FIG. 8. Node 13 remains the master of Node 14 and Node 14 remains the slave of Node 13. Node 13 has also become the master of Node 16, which is now a slave/slave to both Node 13 and Node 15. A permanent connection has been established between Node 13 and Node 16.

The "before" diagram of FIG. 9 depicts a first piconet that includes Nodes 18, 19, and 20, where Node 18 is the master of Nodes 19 and 20. The "before" diagram also depicts a second piconet that includes Nodes 21, 22, 23 and 24, where Node 21 is the master of Nodes 22, 23, and 24. A permanent connection exists between Node 20 in the first piconet and Node 22 in the second piconet. A temporary connection has also been established between these two nodes.

In this case, both piconets have more than one slave, unlike the first piconet in the "before" diagram of FIG. 8, which had only one slave. In such a case, the role determination procedure specifies that the peer node in the smaller piconet is to become a master/slave and the peer node in the larger piconet is to become a slave/slave. That is, the peer node in the smaller piconet remains a slave to its master but also becomes a master to its peer in the larger piconet. The peer in the larger piconet remains a slave to its master but also becomes a slave to the master/slave in the smaller piconet. If the permanent connection between the peers has three hops or less, the permanent connection is retained and the temporary connection is eliminated. If the permanent connection between the peers has more than three hops, the temporary connection replaces the permanent connection.

Applying these rules to the "before" piconet of FIG. 9 results in the "after" piconet of FIG. 9. Node 20 has become a master/slave that is the slave of Node 18 and the master of Node 22. Node 22 has become a slave/slave that is the slave of both Node 18 and Node 21. The temporary connection has replaced the permanent connection.

In FIG. 10, Node 25 is the master of Node 26. Node 26 is a master/slave that is the slave of Node 25 and the master of Node 27 and Node 28. A temporary connection has been established between Node 25 and Node 28. Node 28 is the master in the temporary connection and Node 25 is the slave in the temporary connection.

The role determination procedure specifies that, in such cases, the temporary connection and temporary roles are to be eliminated and the permanent connections and permanent roles are to be retained. This is depicted in the "after" diagram of FIG. 10, where the temporary connection and the temporary roles have been eliminated. If Node 25 were a master/slave instead of a master, the role determination procedure would be applied in the same manner.

FIG. 11 depicts a situation similar to that of FIG. 10, except that, in this case, the node that has the role of temporary master also has the role of a permanent master and the node that has the role of temporary slave also has the role of a permanent slave. That is, Node 29 is the permanent master of Node 30 and also a temporary master in a temporary connection with Node 32. Node 30 is a master/slave that is the slave of Node 29 and the master of Nodes 31 and 32. Node 32 is a permanent slave of Node 30 and a temporary slave of Node 29.

The role determination procedure specifies that, in such cases, the temporary connection is to become permanent and the nodes that were connected by the temporary connection are to retain their temporary roles. The permanent connection between the node that had the role of temporary slave and its permanent master is to be eliminated and that node is to become the slave of the node that had the role of temporary master.

Applying these rules to the "before" piconet of FIG. 11 results in the "after" piconet of FIG. 11. The temporary connection between Nodes 29 and 32 has become permanent. The permanent connection between Nodes 30 and 32 has been eliminated. Node 29 has become the master of Node 32 as well as retaining its role as master of Node 30. Node 30 is now the master only of Node 31. Node 32 is now the slave of Node 29 instead of Node 30. If Node 29 were a master/slave instead of a master, the role determination procedure would be applied in the same manner.

Figure 12:
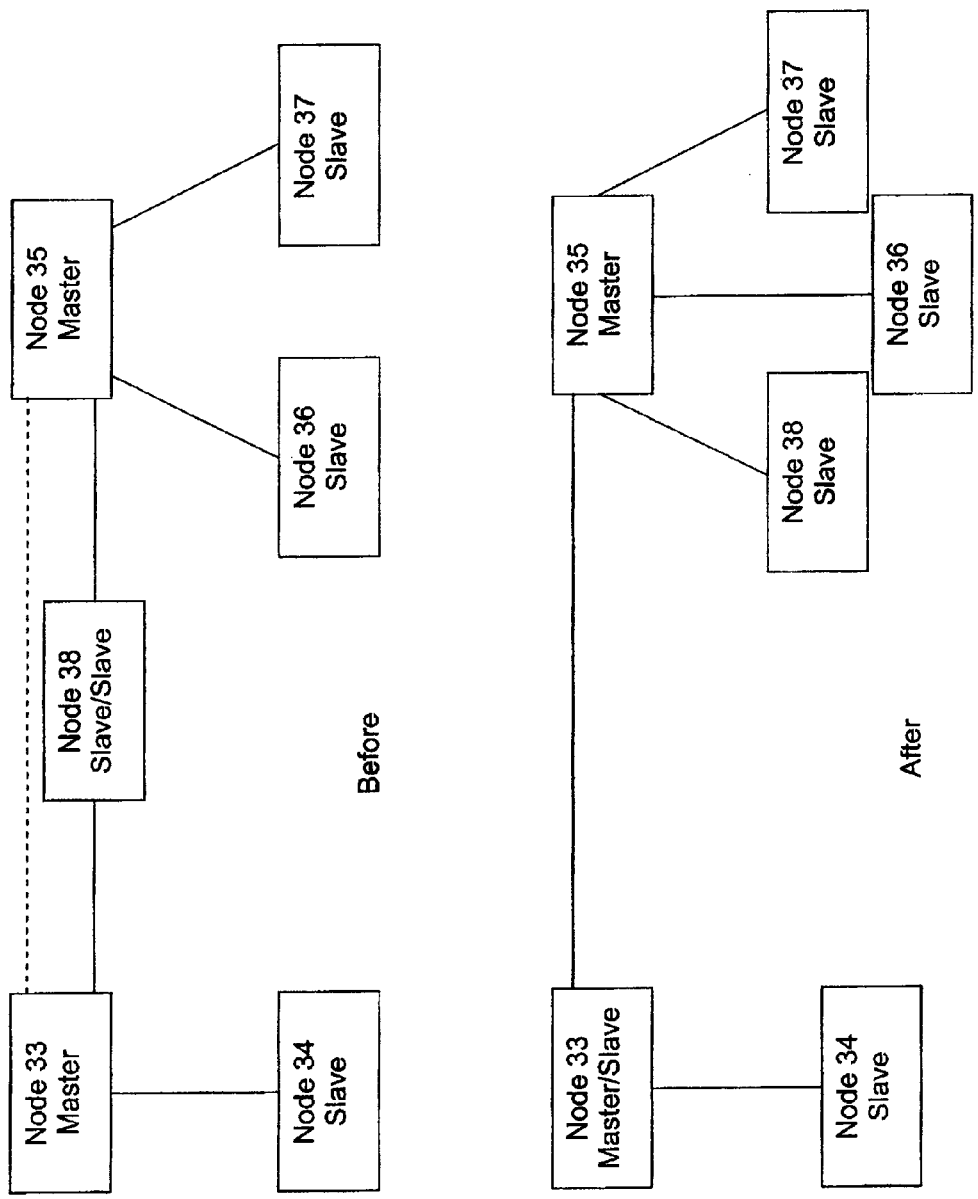
FIG. 12 is a diagram of another plurality of nodes to which a role determination procedure could be applied according to an embodiment of the disclosure.

The "before" diagram of FIG. 12 depicts two piconets, one of which has only one slave under its master and the other of which has more than one slave under its master. Specifically, the first piconet includes Node 33, which is a master, and Node 34, which is a slave. The second piconet includes Node 35, which is a master, and Nodes 36 and 37, which are slaves. The two masters, Nodes 33 and 35, have a two-hop connection with one another. That is, a slave/slave node, Node 38, has permanent connections to both Node 33 and Node 35. A temporary connection has also been established between Node 33 and Node 35.

The role determination procedure specifies that, in such cases, the temporary connection is to become permanent and the permanent connection between the slave/slave node and the master node in the smaller piconet is to be eliminated. The former slave/slave node then becomes the slave only of the master node in the larger piconet. The master node in the smaller piconet becomes a master/slave node that is a slave of the master in the larger piconet and that remains the master of the node over which it was previously the master.

Applying these rules to the "before" piconet of FIG. 12 results in the "after" piconet of FIG. 12. The temporary connection between Nodes 33 and 35 has become permanent. The permanent connection between Nodes 33 and 38 has been eliminated. Node 38 has become the slave only of Node 35. Node 33 has become a master/slave that is the master of Node 34 and a slave of Node 35.

Figure 13:
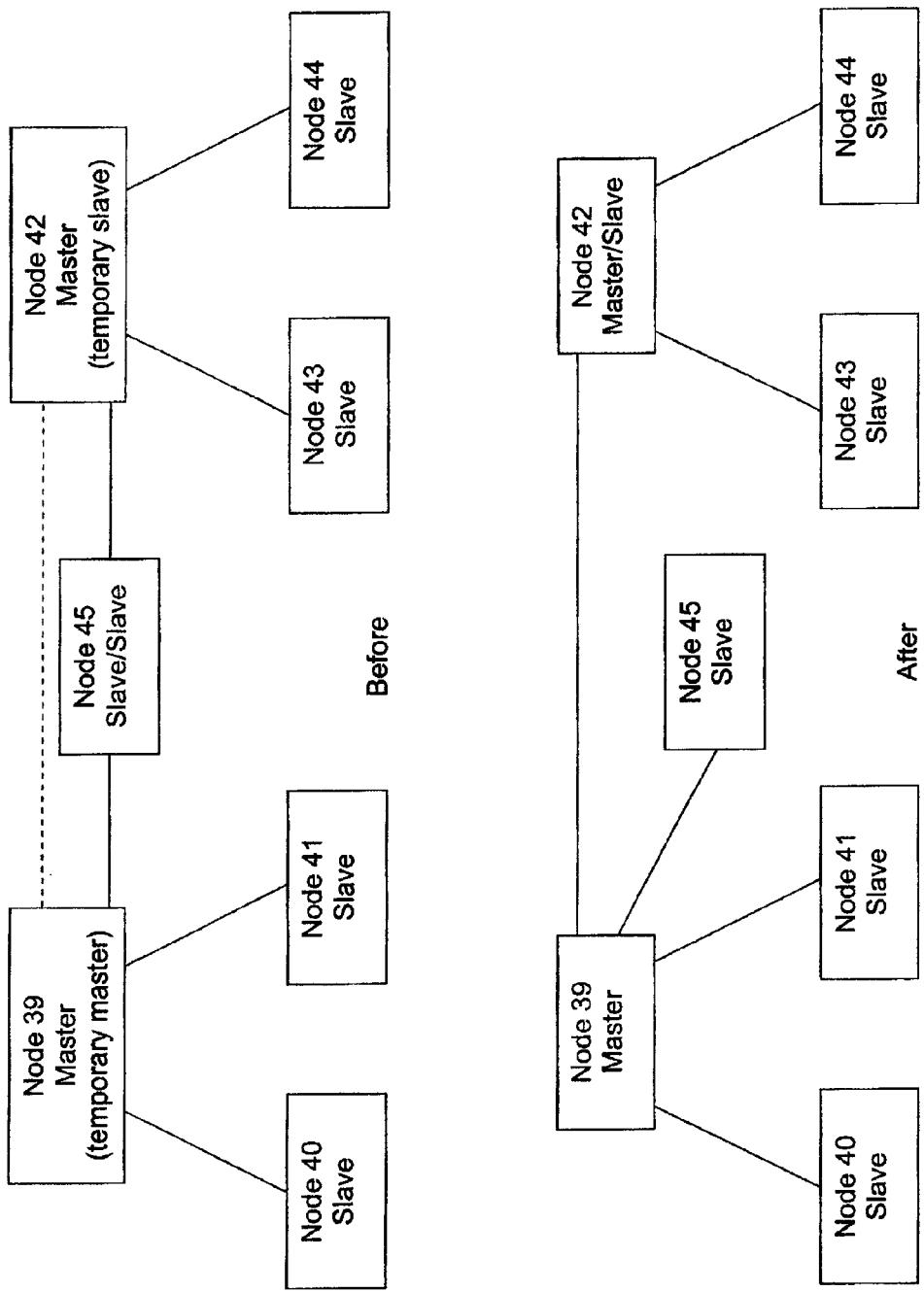
FIG. 13 is a diagram of another plurality of nodes to which a role determination procedure could be applied according to an embodiment of the disclosure.

FIG. 13 depicts a situation similar to that of FIG. 12, except that, in this case, the master node in each piconet has more than one slave under it. Specifically, the first piconet includes Node 39, which is a master, and Nodes 40 and 41, which are slaves. The second piconet includes Node 42, which is a master, and Nodes 43 and 44, which are slaves. The two masters, Nodes 39 and 42, have a two-hop connection with one another. That is, a slave/slave node, Node 45, has permanent connections to both Node 39 and Node 42. A temporary connection has also been established between Node 39 and Node 42.

The role determination procedure specifies that, in such cases, the temporary connection between the two master nodes is to become permanent and the slave/slave node is to become the slave of only one of the masters. The temporary roles held by the two master nodes that have the temporary connection determine which of the master nodes will become the sole master of the slave/slave node. In an embodiment, the master node that had the role of master in the temporary connection becomes the sole master of the node that had been the slave/slave node. The master node that had the role of master in the temporary connection also becomes the master of the master node that had the role of slave in the temporary connection. The master node that had the role of slave in the temporary connection becomes a master/slave node that is the slave of the master node that had the role of master in the temporary connection and remains the master of the slave nodes over which it was previously the master.

Applying these rules to the "before" piconet of FIG. 13 results in the "after" piconet of FIG. 13. The temporary connection between Nodes 39 and 42 has become permanent. The permanent connection between Nodes 42 and 45 has been eliminated. Node 45 has become the slave only of Node 39. Node 42 has become a master/slave node that is the slave of node 39 and the master of Nodes 43 and 44.

Figure 14:
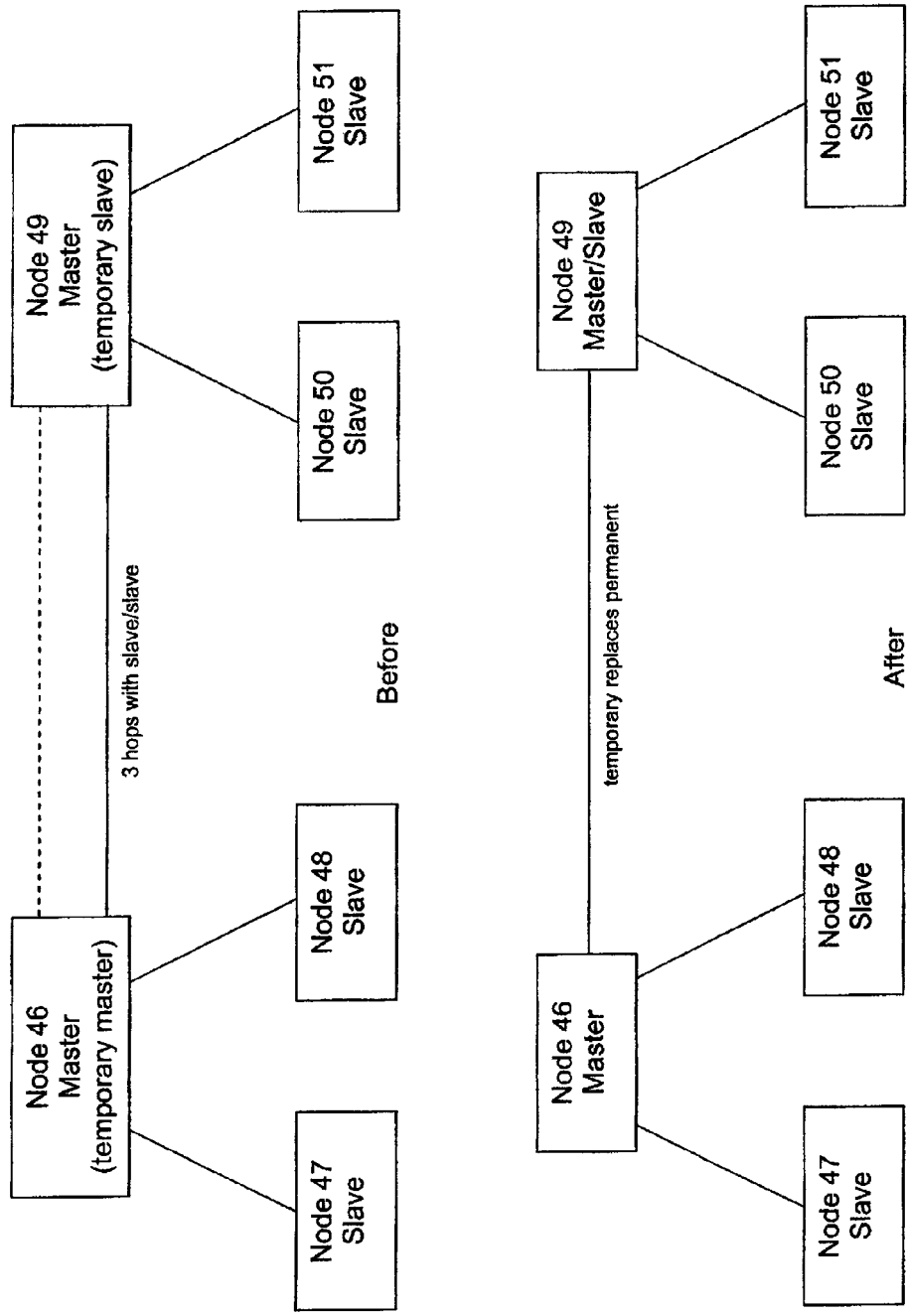
FIG. 14 is a diagram of another plurality of nodes to which a role determination procedure could be applied according to an embodiment of the disclosure.

FIG. 14 depicts a situation similar to that of FIG. 13, except that, in this case, the permanent connection between the two master nodes is a 3-hop connection instead of a 2-hop connection. One of the intermediate nodes in the permanent connection is assumed to be a slave/slave node. In such cases, the role determination procedure specifies that the temporary connection is to replace the permanent connection. The node that was the master in the temporary connection remains the master in the new permanent connection and the node that was the slave in the temporary connection becomes a master/slave in the new permanent connection.

This is depicted in the "after" diagram of FIG. 14, where the 3-hop, permanent connection that had connected master Node 46 and master Node 49 has been eliminated and the temporary connection between those nodes has become permanent. Since Node 46 was the master node in the temporary connection of the "before" diagram and Node 49 was the slave node in the temporary connection, Node 46 has remained a master node in the "after" diagram and Node 49 has become a master/slave node that is a slave of Node 46.

Figure 15:
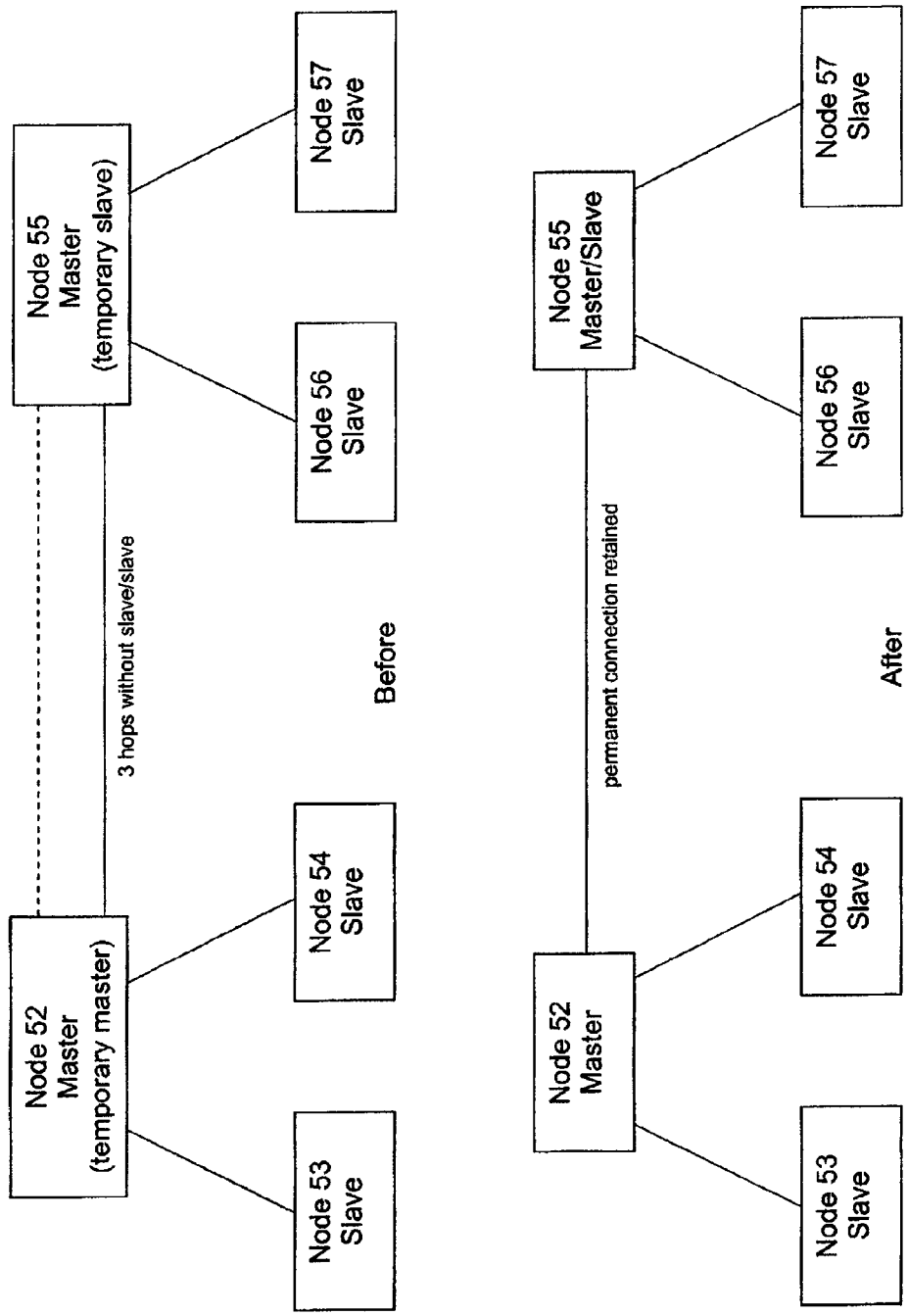
FIG. 15 is a diagram of another plurality of nodes to which a role determination procedure could be applied according to an embodiment of the disclosure.

FIG. 15 depicts a situation similar to that of FIG. 14, except that, in this case, neither of the intermediate nodes in the 3-hop, permanent connection between the two master nodes is a slave/slave node. In such cases, the role determination procedure specifies that the temporary connection is to be eliminated and the permanent connection is to be retained. The node that was the master in the temporary connection remains the master in the permanent connection and the node that was the slave in the temporary connection becomes a master/slave in the permanent connection.

This is depicted in the "after" diagram of FIG. 15, where the temporary connection between master Node 52 and master Node 55 has been eliminated and the permanent, 3-hop connection that had connected those nodes has been retained. Since Node 52 was the master node in the temporary connection of the "before" diagram and Node 55 was the slave node in the temporary connection, Node 52 has remained a master node in the "after" diagram and Node 55 has become a master/slave node that is a slave of Node 52.

FIG. 16 depicts a situation similar to that of FIG. 13, except that, in this case, one of the master nodes has permanent and temporary connections to a master/slave node rather than to another master node. More specifically, a first piconet includes a master Node 58 and two slave Nodes 59 and 60. A second piconet includes a master Node 61, a master/slave Node 62, and two slave Nodes 63 and 64. The master/slave Node 62 is the slave of Node 61 and the master of Nodes 63 and 64. Master Node 58 is connected to master/slave Node 62 by a temporary connection and by a 2-hop, permanent connection that includes a slave/slave Node 65.

As with the situation in FIG. 13, the role determination procedure specifies that the temporary connection is to become permanent and the slave/slave node is to become the slave of only one node. The temporary roles held by the two nodes that have the temporary connection determine which of those nodes will become the sole master of the slave/slave node. In an embodiment, the node that had the role of slave in the temporary connection becomes the sole master of the node that had been the slave/slave node. The node that had the role of slave in the temporary connection also becomes the master of the node that had the role of master in the temporary connection. The node that had the role of master in the temporary connection becomes a master/slave node that is the slave of the node that had the role of slave in the temporary connection and remains the master of the slave nodes over which it was previously the master.

Applying these rules to the "before" piconet of FIG. 16 results in the "after" piconet of FIG. 16. The temporary connection between Nodes 58 and 62 has become permanent. The permanent connection between Nodes 58 and 65 has been eliminated. Node 65 has become the slave only of Node 62. Node 58 has become a master/slave node that is the slave of node 62 and the master of Nodes 59 and 60.

FIG. 17 depicts a situation similar to that of FIG. 16, except that, in this case, the permanent connection between the master node in the first piconet and the master/slave node in the second piconet is a 3-hop connection. More specifically, the permanent connection between master Node 66 and master/slave Node 70 includes a slave/slave Node 73 and a master/slave Node 74.

The role determination procedure specifies that, in such cases, the temporary connection is to become permanent, the connection between the slave/slave node and the master node or between the slave/slave node and the master/slave node is to be eliminated, and the slave/slave node is to become a slave node. That is, in a 3-hop connection such as that in FIG. 17, a slave/slave node will be connected to a master/slave node within the 3-hop connection and to either a master node or to another master/slave node. The slave/slave node's connection to the master/slave node within the 3-hop connection is retained, the slave/slave node's other connection is eliminated, and the slave/slave becomes a slave. The master/slave node within the 3-hop connection remains the master of the former slave/slave node and remains the slave of its previous master. The node from which the former slave/slave was disconnected becomes a master/slave that is a slave of the master or master/slave node in the other piconet.

Applying these rules to the "before" piconet of FIG. 17 results in the "after" piconet of FIG. 17. The temporary connection between Nodes 66 and 70 has become permanent. The permanent connection between Nodes 66 and 73 has been eliminated. Node 74 remains a master/slave that is a slave of Node 70 and a master of Node 73. Node 73 has become a slave of Node 74. Node 66 has become a master/slave node that is the slave of Node 70 and the master of Nodes 67 and 68.

If Node 73 had been a master/slave and Node 74 had been a slave/slave, the permanent connection between Node 74 and Node 70 would have been eliminated. Node 73 would have remained a master/slave node with Node 66 as its master and Node 74 as its slave. Node 66 would have again become a master/slave node with Node 70 as its master but with Nodes 67, 68, and 73 as its slaves.

FIG. 18 can depict several different situations that are similar to those depicted in FIGS. 16 and 17. That is, a first piconet includes a master node and a plurality of slave nodes under the master node. A second piconet includes a master node, a master/slave node under the master node, and a plurality of slave nodes under the master/slave node. A permanent connection and a temporary connection connect the master node in the first piconet and the master/slave node in the second piconet.

The role determination procedure specifies that, in such cases, if there is no slave/slave node in the permanent connection, the temporary connection is to be eliminated and the permanent connection is to be retained. The permanent connection in the "before" diagram in FIG. 18 might be a 2-hop connection, a 3-hop connection, or some other connection. As long as no slave/slave node is present in the permanent connection, the permanent connection is retained. This is depicted in the "after" diagram of FIG. 18, where the temporary connection has been eliminated and the permanent connection has been retained.

In an embodiment, the nodes include a caching mechanism that retains a record of temporary connections that have been made but not retained and permanent connections that have been eliminated. When the role determination procedure is applied to a potential temporary connection, the cache can be consulted to determine if a similar temporary connection has been made and rejected in the past. If so, the role determination procedure might specify that the temporary connection should not be attempted again and that procedures such as those described above need not be applied to the potential temporary connection. This can eliminate repetitive attempts at making temporary connections that will not be retained.

In an embodiment, when the role determination procedure is complete for a pair of nodes that had formed a temporary connection, the two nodes can inform the other nodes in the piconet of the relationship that they have formed. In this way, all of the nodes in piconet can have updated information about all other nodes. The nodes that had formed a temporary connection might send the updates only when their relationship has changed. If their temporary connection is eliminated and their existing relationship is retained, an update might not be sent to the other nodes.

Figure 19:
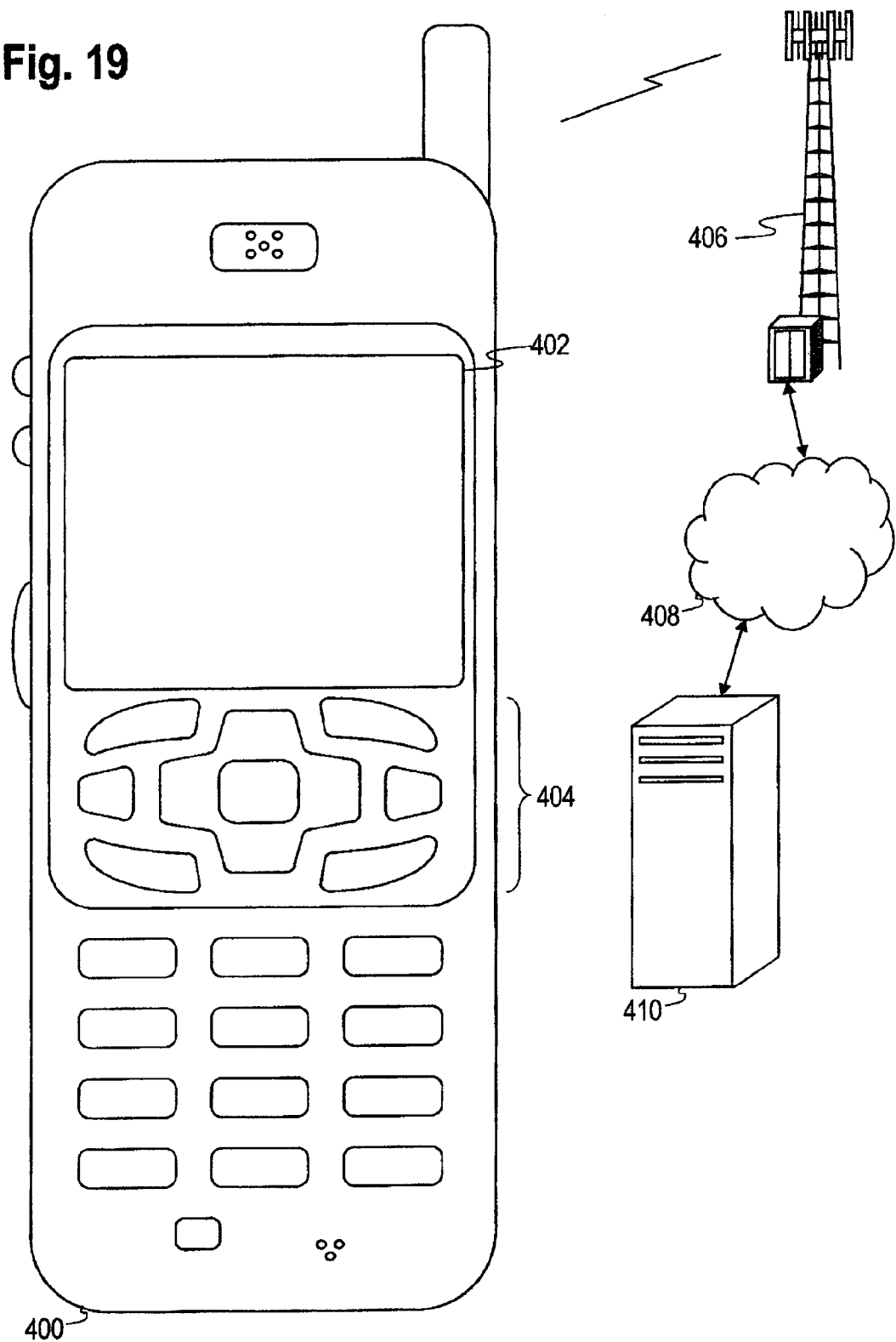
FIG. 19 is a diagram of a wireless communications system including a handset operable for some of the various embodiments of the disclosure.

FIG. 19 shows a wireless communications system including a handset 400 that may be operable for implementing aspects of the present disclosure, but the present disclosure should not be limited to these implementations. Though illustrated as a mobile phone, the handset 400 may take various forms including a wireless handset, a pager, a personal digital assistant (PDA), a portable computer, a tablet computer, or a laptop computer. Many suitable handsets combine some or all of these functions. In some embodiments of the present disclosure, the handset 400 is not a general purpose computing device like a portable, laptop or tablet computer, but rather is a special-purpose communications device such as a mobile phone, wireless handset, pager, or PDA.

The handset 400 includes a display 402 and a touch-sensitive surface or keys 404 for input by a user. The handset 400 may present options for the user to select, controls for the user to actuate, and/or cursors or other indicators for the user to direct. The handset 400 may further accept data entry from the user, including numbers to dial or various parameter values for configuring the operation of the handset 400. The handset 400 may further execute one or more software or firmware applications in response to user commands. These applications may configure the handset 400 to perform various customized functions in response to user interaction.

Among the various applications executable by the handset 400 are a web browser, which enables the display 402 to show a web page. The web page is obtained via wireless communications with a cell tower 406, a wireless network access node, or any other wireless communication network or system. The cell tower 406 (or wireless network access node) is coupled to a wired network 408, such as the Internet. Via the wireless link and the wired network, the handset 400 has access to information on various servers, such as a server 410. The server 410 may provide content that may be shown on the display 110.

Figure 20:
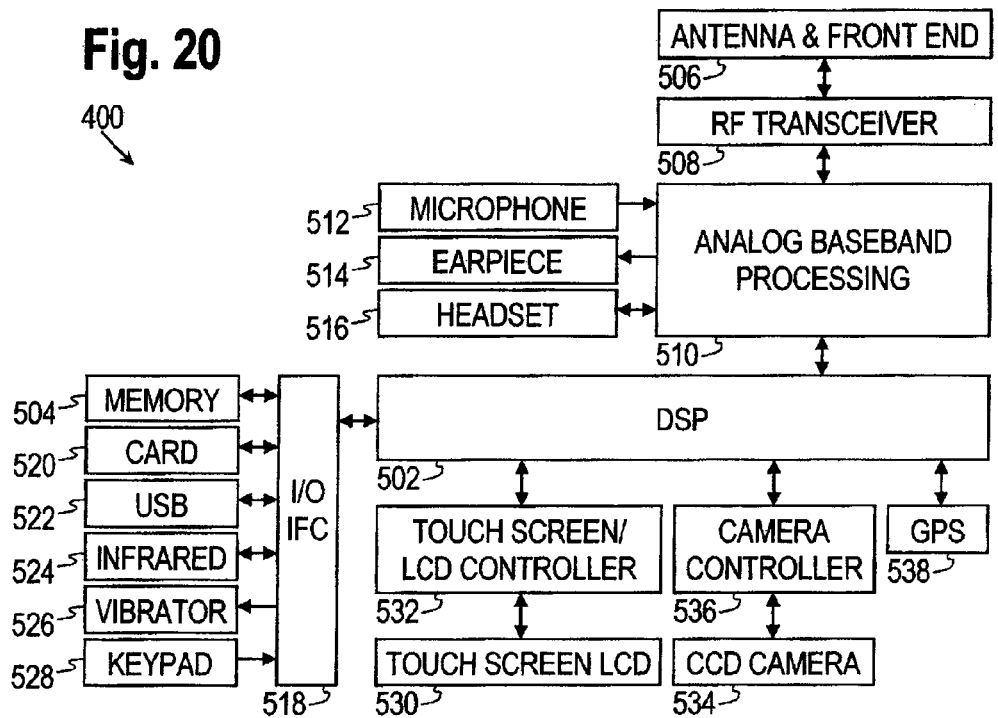
FIG. 20 is a block diagram of a handset operable for some of the various embodiments of the disclosure.

FIG. 20 shows a block diagram of the handset 400. The handset 400 includes a digital signal processor (DSP) 502 and a memory 504. As shown, the handset 400 may further include an antenna and front end unit 506, a radio frequency (RF) transceiver 508, an analog baseband processing unit 510, a microphone 512, an earpiece speaker 514, a headset port 516, an input/output interface 518, a removable memory card 520, a universal serial bus (USB) port 522, an infrared port 524, a vibrator 526, a keypad 528, a touch screen liquid crystal display (LCD) with a touch sensitive surface 530, a touch screen/LCD controller 532, a charge-coupled device (CCD) camera 534, a camera controller 536, and a global positioning system (GPS) sensor 538.

The DSP 502 or some other form of controller or central processing unit operates to control the various components of the handset 400 in accordance with embedded software or firmware stored in memory 504. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The antenna and front end unit 506 may be provided to convert between wireless signals and electrical signals, enabling the handset 400 to send and receive information from a cellular network or some other available wireless communications network. The RF transceiver 508 provides frequency shifting, converting received RF signals to baseband and converting baseband transmit signals to RF. The analog baseband processing unit 510 may provide channel equalization and signal demodulation to extract information from received signals, may modulate information to create transmit signals, and may provide analog filtering for audio signals. To that end, the analog baseband processing unit 510 may have ports for connecting to the built-in microphone 512 and the earpiece speaker 514 that enable the handset 400 to be used as a cell phone. The analog baseband processing unit 510 may further include a port for connecting to a headset or other hands-free microphone and speaker configuration.

The DSP 502 may send and receive digital communications with a wireless network via the analog baseband processing unit 510. In some embodiments, these digital communications may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB interface 522 and the infrared port 524. The USB interface 522 may enable the handset 400 to function as a peripheral device to exchange information with a personal computer or other computer system. The infrared port 524 and other optional ports such as a Bluetooth interface or an IEEE 802.11 compliant wireless interface may enable the handset 400 to communicate wirelessly with other nearby handsets and/or wireless base stations.

The input/output interface 518 may further connect the DSP 502 to the vibrator 526 that, when triggered, causes the handset 400 to vibrate. The vibrator 526 may serve as a mechanism for silently alerting the user to any of various events such as an incoming call, a new text message, and an appointment reminder.

The keypad 528 couples to the DSP 502 via the interface 518 to provide one mechanism for the user to make selections, enter information, and otherwise provide input to the handset 400. Another input mechanism may be the touch screen LCD 530, which may also display text and/or graphics to the user. The touch screen LCD controller 532 couples the DSP 502 to the touch screen LCD 530.

The CCD camera 534 enables the handset 400 to take digital pictures. The DSP 502 communicates with the CCD camera 534 via the camera controller 536. The GPS sensor 538 is coupled to the DSP 502 to decode global positioning system signals, thereby enabling the handset 400 to determine its position. Various other peripherals may also be included to provide additional functions, e.g., radio and television reception.

Figure 21:
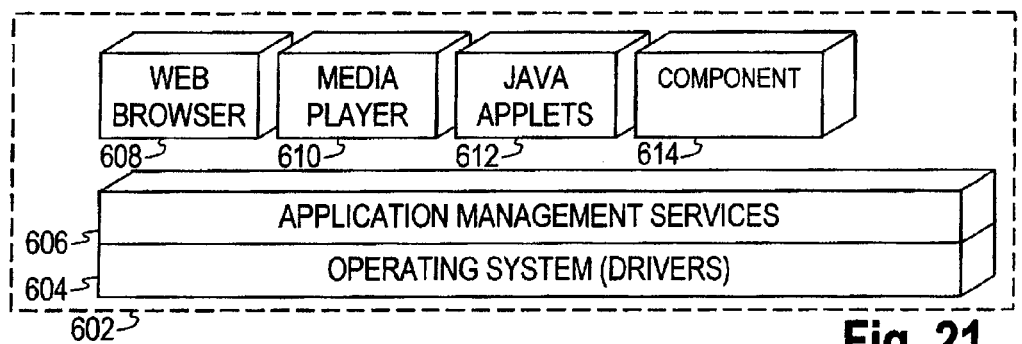
FIG. 21 is a diagram of a software environment that may be implemented on a handset operable for some of the various embodiments of the disclosure.

FIG. 21 illustrates a software environment 602 that may be implemented by the DSP 502. The DSP 502 executes operating system drivers 604 that provide a platform from which the rest of the software operates. The operating system drivers 604 provide drivers for the handset hardware with standardized interfaces that are accessible to application software. The operating system drivers 604 include application management services ("AMS") 606 that transfer control between applications running on the handset 400. Also shown in FIG. 21 are a web browser application 608, a media player application 610, and Java applets 612. The web browser application 608 configures the handset 400 to operate as a web browser, allowing a user to enter information into forms and select links to retrieve and view web pages. The media player application 610 configures the handset 400 to retrieve and play audio or audiovisual media. The Java applets 612 configure the handset 400 to provide games, utilities, and other functionality. A component 614 might provide functionality related to scatternet connectivity.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method for wireless communication by a plurality of devices in a scatternet network, comprising:
    discovering, at a first device, a second device of the plurality of devices in the scatternet network;
    determining, at the first device, one or more roles for the first device in association with a connection to the second device, the roles selected from a group consisting of slave, master/slave, and master;
    transferring application-related data between the first device and a third device having an active scatternet connection with the first device, wherein the transferring and determining steps occur at least partially simultaneously; and
    deciding, at the first device, at least one of: whether to maintain a temporary connection with the second device and whether to maintain the active scatternet connection with the third device, wherein the transferring and deciding steps occur at least partially simultaneously.

2. The method of claim 1, wherein the determining is further defined as at least one of: the first device determining whether to switch roles with the second device, and the first device determining whether to switch roles with the third device.

3. The method of claim 1, wherein each device is selected from a group consisting of mobile communication devices, mobile phones, personal digital assistants, laptop computers, tablet computers, wireless access points, desktop computers, and personal computers.

4. The method of claim 1, wherein the plurality of wireless devices wirelessly communicate via Bluetooth.

5. The method of claim 1, further comprising transmitting hop information between the plurality of network devices.

6. The method of claim 5, wherein only information related to a topology of the scatternet network is delayed.

7. The method of claim 1, further comprising:
    deciding to disconnect;
    requesting to disconnect; and terminating the connection between the plurality of devices.

8. A system for communication in a scatternet, comprising:
a first wireless device having a processor configured to:
discover a second wireless device in the scatternet network,
determine one or more roles for the first wireless device in association with a connection to the second device, the roles selected from a group consisting of slave, master/slave, and master,
transfer application-related data between the first wireless device and a third wireless device having an active scatternet connection with the first device, such that the transfer and the discovery occur at least partially simultaneously, and
decide at least one of: whether to maintain a temporary connection with the second device and whether to maintain the active scatternet connection with the third device, such that the transfer and decision occur at least partially simultaneously.

9. The system of claim 8, wherein the first wireless device is selected from a group consisting of mobile communication devices, mobile phones, personal digital assistants, laptop computers, tablet computers, wireless access points, desktop computers, and personal computers.

10. The system of claim 8, wherein the wireless devices communicate via Bluetooth.

11. The system of claim 8, wherein the first wireless device and second wireless device transmit hop information between each other.

12. The system of claim 11, wherein only information related to a topology of the scatternet network is not transmitted at substantially the same time as the discovery, roles determination, and data transfer.

13. A system for communication in a scatternet network, comprising:
a first wireless device;
a second wireless device; and
a third wireless device having an active scatternet connection with the first wireless device,
wherein the first wireless device is configured to:
discover the second wireless device,
determine one or more roles for the first wireless device in association with a connection to the second device, the roles selected from a group consisting of slave, master/slave, and master,
transfer application-related data between the first wireless device and the third wireless device, such that the transfer and the discovery occur at least partially simultaneously, and
decide at least one of: whether to maintain a temporary connection with the second device and whether to maintain the active scatternet connection with the third device, such that the transfer and decision occur at least partially simultaneously.

14. The system of claim 13, wherein the first wireless device and second wireless device are selected from a group consisting of mobile communication devices, mobile phones, personal digital assistants, laptop computers, tablet computers, wireless access points, desktop computers, and personal computers.

15. The system of claim 13, wherein the first wireless device and second wireless device communicate via Bluetooth.

16. The system of claim 13, wherein the first wireless device and second wireless device are configured to transmit hop information between one another, and wherein only information related to a topology of the scatternet network is delayed.

17. The system of claim 13, further comprising:
the first wireless device configured to request a connection with the second wireless device;
wherein the first and second devices decide on a decision maker as between the first and second devices; and
deciding whether to maintain a connection.

18. The system of claim 17, further comprising:
when the first wireless device decides to disconnect, the first wireless device requests to disconnect from the second wireless device and the second wireless device sends a confirmation.

19. The system of claim 13, wherein only information related to a topology of the scatternet network is not transmitted at substantially the same time as the discovery, roles determination, and data transfer.

20. The system of claim 8, further comprising:
when the first wireless device decides to disconnect, the first wireless device requests to disconnect from the second wireless device and the second wireless device sends a confirmation.

* * * * *